United States Patent
Singh et al.

(10) Patent No.: US 12,315,514 B2
(45) Date of Patent: May 27, 2025

(54) SYSTEMS AND METHODS FOR MANAGING MULTIPLE VOICE ASSISTANT SERVICES BASED ON VOICE INPUT

(71) Applicant: Adeia Guides Inc., San Jose, CA (US)

(72) Inventors: Gyanveer Singh, Bangalore (IN); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 335 days.

(21) Appl. No.: 17/865,567

(22) Filed: Jul. 15, 2022

(65) Prior Publication Data
US 2024/0021205 A1    Jan. 18, 2024

(51) Int. Cl.
| | | |
|---|---|---|
| *G10L 15/32* | (2013.01) | |
| *G10L 15/04* | (2013.01) | |
| *G10L 15/18* | (2013.01) | |
| *G10L 15/22* | (2006.01) | |

(52) U.S. Cl.
CPC .............. *G10L 15/32* (2013.01); *G10L 15/04* (2013.01); *G10L 15/1815* (2013.01); *G10L 15/22* (2013.01); *G10L 2015/223* (2013.01)

(58) Field of Classification Search
CPC ..... G10L 15/32; G10L 15/04; G10L 15/1815; G10L 15/22; G10L 2015/223; G10L 15/1822
See application file for complete search history.

(56) References Cited

U.S. PATENT DOCUMENTS

| | | |
|---|---|---|
| 10,573,321 B1 | 2/2020 | Smith et al. |
| 10,971,173 B2 | 4/2021 | Kothari et al. |
| 11,145,298 B2 | 10/2021 | Maker et al. |
| 11,188,808 B2 | 11/2021 | Wang et al. |
| 2018/0277113 A1* | 9/2018 | Hartung .................. G10L 15/22 |
| 2018/0293484 A1* | 10/2018 | Wang ..................... G06F 16/632 |
| 2019/0124020 A1* | 4/2019 | Bobbarjung ............ H04L 51/02 |
| 2020/0084206 A1* | 3/2020 | Vaidya ................. H04L 63/0861 |
| 2020/0110864 A1* | 4/2020 | Casado ................... G10L 17/06 |
| 2020/0204613 A1* | 6/2020 | Hatambeiki ........... G05B 15/02 |
| 2021/0360106 A1* | 11/2021 | Matula .................... G06F 40/51 |
| 2022/0246146 A1* | 8/2022 | Nouri ..................... G10L 25/51 |

(Continued)

OTHER PUBLICATIONS https://csa-iot.org/all-solutions/matter/.

(Continued)

*Primary Examiner* — Darioush Agahi
(74) *Attorney, Agent, or Firm* — Haley Guiliano LLP

(57) ABSTRACT

Systems and methods are described for assigning a voice assistant service (VAS) from multiple VASs, based on a voice input. The system generally comprises a processor that is configured to process at least one voice input, e.g., with a wake word, and assign at least one VAS to output a response based on the voice input. Some embodiments support the skill or skills of a secondary VAS when the primary VAS is unavailable or when the primary VAS does not possess the required skill. The system may evaluate the skills required to process a user request based on the context and/or intent. The system may distribute data related to voice input and context and/or intent among various VASs to complete a task. Furthermore, the system may classify voice input as generic voice input or target VAS-specific voice input, e.g., by utilizing a trained model.

20 Claims, 12 Drawing Sheets

(56) References Cited

U.S. PATENT DOCUMENTS

| | | | | |
|---|---|---|---|---|
| 2023/0105362 A1* | 4/2023 | Kuhrt | .................... | G10L 15/22 |
| | | | | 704/275 |
| 2023/0154460 A1* | 5/2023 | Norton, Jr. | .............. | G06F 3/167 |
| | | | | 704/275 |
| 2023/0370506 A1* | 11/2023 | Ramin | ................ | H04L 65/1094 |

OTHER PUBLICATIONS https://developer.amazon.com/en-IN/docs/alexa/alexa-voice-service/donotdisturb.html.

https://www.frontiersin.org/articles/10.3389/fcomp.2021.685250/full.

https://www.zdnet.com/article/linux-foundation-partners-with-microsoft-and-target-to-create-standards-for-voice-technology/.

\* cited by examiner

900

SYSTEMS AND METHODS FOR MANAGING MULTIPLE VOICE ASSISTANT SERVICES BASED ON VOICE INPUT

BACKGROUND

The present disclosure relates to voice control systems, and more particularly to systems and related processes for assigning a voice assistant service (VAS) based on context of the voice input.

SUMMARY

Use of voice searching and voice commands has increased tremendously. Implementations, such as voice-enabled assistants on smartphones, tablets, computers, speakers, and other connected devices, may allow enhanced, quick search mechanisms via voice. Generally, voice assistant services receive voice inputs from users and provide responses via speaker, display, or other output as answers. Voice assistants may also have programmable skills and/or features to fetch specific content and data about, e.g., music, area-specific weather, sports scores, news, shopping, games, recipes, banking, networked devices, and more. Each voice assistant platform may have its own set of skills, features, applications, and/or services comprising some unique features and some services shared with other VASs. Some voice receivers may utilize multiple voice platforms and, thus, may have different skill sets. Moreover, voice assistant devices have become so ubiquitous that there may be multiple receivers within earshot at any given time. A voice request or command may potentially be fulfilled by multiple voice platforms on multiple devices. For instance, if an Amazon® Echo using Alexa device is "off" or set to a do-not-disturb mode, an Apple® iPhone® or iPad® using Sin may be available to respond to a query. If a Google® Home device is asked to change the channel on the new TV, but Google does not have the requisite voice assistant skill, perhaps the Samsung® voice platform, Bixby, may be able to fulfill the command. If Cortana from Microsoft® cannot interface with a doorbell intercom, perhaps Google Assistant can. May be a user requests turning the outdoor lights on from Siri but Siri is unavailable and or Amazon® Alexa can prompt the user for permission to add a new "outdoor light" service. There exists a need to enable a secondary voice assistant service to perform a task and/or command when a first voice assistant service is, e.g., set to a do-not-disturb mode, busy, lacking a skill and/or application, or otherwise unavailable.

Electronic devices may be designed to facilitate content consumption in several ways, including via network-connected microphones, speakers, and virtual voice assistants. Devices such as computers, telephones, smartphones, tablets, voice-controlled devices, servers, televisions, and other internet-enabled appliances can provide and/or deliver content almost instantly. Content like video, animation, music, audiobooks, ebooks, playlists, podcasts, images, slideshows, games, text, and other media may be consumed by users at any time, as well as nearly in any place. Virtual voice assistants have become key interfaces for users to access content, receive information, and interact with devices connected to a network.

Many available devices can be implemented as network-connected devices in a home or in an office. Such network-connected devices may be capable of communicating with each other and a controller such as a VAS, which may be used to control the network-connected devices, e.g., using voice interaction. A voice assistant service typically includes a virtual assistant platform such as Google Home; Siri in Apple HomePod, iPhones, and other devices; Alexa in Amazon® Echo; as well as other home assistants and/or hubs.

Existing voice assistants typically implement a cloud-based "wake word" (or "trigger word") verification mechanism in order to reduce false wakes and discard any utterance when needed. The voice assistant systems or devices such as smart speakers or consumer devices use wake-word engines to detect wake words such as "Alexa" and "Hey Siri." The VAS systems further implement automatic speech recognition (ASR) and natural language processing (NLP) services for analyzing speech and determining a user's intent from the user voice input in a faster and more accurate way.

A smart home may comprise various intelligent devices such as network-connected televisions, monitors, phones, watches, remote controls, voice-controlled speakers, etc., which can communicate with each other either via a hub, and/or via cloud servers. Such intelligent devices can be referred as internet of things ("IoT") devices which can communicate over a network and allows the user to access the device functionality even from remote locations. Existing smart homes implement multiple VASs and can be configured by the user such that the intelligent devices from may be controlled from various locations. In some instance, IoT devices may be able to connect with one another via networks, sub-setworks, platforms, etc.

A problem may exist when a user's voice input includes a wake word for a specific VAS, and that VAS may not be available for the service. There may be many reasons as to why a VAS may be "unavailable, including, e.g., the VAS may not be present, may be in a do-not-disturb (e.g., "DoNotDisturb" or DND) mode, the VAS may show busy status (e.g., during a call or content playback), the VAS may be powered down and/or switched off, and/or the VAS may not be configured with the required skill, feature, or service. Since, the voice input may have invoked a particular VAS, other VASs may not process the user input, e.g., automatically.

In some approaches, VASs can be configured to process voice inputs without wake words, which may allow processing by an alternate VAS based on its availability. However, there may be some queries that should only be processed by the intended VAS. All the queries cannot automatically be forwarded to an alternate VAS due to various reasons such as security issues, user preferences, incapability to process such requests, or that the alternative VAS may not be configured with the required skills, even though capable of performing the action. Further, problems persist when each VAS requires the IoT devices within the home to be configured to operate in its respective ecosystem. For example, if a user says "Siri, turn off the TV" and if the TV is not configured to operate in Siri ecosystem, the user may receive a response like "Sorry, I can't process your request." The TV might have been configured to be controlled through Alexa and not Siri.

In some cases, each VAS platform may have its own group of devices and/or IoT devices, e.g., only accessible via the corresponding VAS and its associated skills and commands. For example, a network-connected lamp may be compatible with Echo but not Apple HomeKit. A thermostat may be able to communicate with a Google Home device but not Amazon Alexa. A wireless speaker may connect with Bose systems and not Sonos systems. A leak-detection alarm system may require a skill only available with iOS devices and not configurable for any Echo products or services. In such siloed environments, there exists a need for communication of data between VASs, e.g., when a required VAS is not available to perform a voice command.

As disclosed herein, systems and methods may manage multiple voice assistant services (VASs) based on voice input. In some embodiments, a system for assigning a VAS based on a voice input may comprise a processor that may be configured to process at least one voice input with at least one wake word and assign at least one VAS to output a response based on the voice input. In some embodiments, a processor may comprise a context identification module, a skill assessment module, a user permission module, a classification module, and a VAS interaction module. The context identification module may be configured to identify at least one context from the voice input in case a primary VAS associated with the wake word is not available for service. The skill assessment module may be configured to assess at least one skill of a secondary VAS from multiple VASs based on the identified context, required for processing the voice input. The user permission module may be configured to seek permission from a user to configure the skill in case the assessed skill is not present in the secondary VAS. The classification module may be configured to classify the context into a plurality of segments to assign at least one segment to one VAS from the multiple VASs based on at least one user preference, and the skill and availability of the VAS. For instance, a segment may be of one type of voice input and a second segment may be of a different type of voice input. A type of voice input may be, e.g., a query, a command, a generic voice input (e.g., that any VAS may be able to respond to), or a VAS-specific type of voice input.

For instance, in some embodiments, a voice query may be made to an unavailable target VAS, so a second VAS must be assigned to respond to the voice query. For example, a user may say, "Hey [target VAS], what's the weather like outside today?," to one or more VASs, which are in communication with a VAS assignment system. The VAS assignment system may determine that the target VAS is unavailable and/or busy (e.g., offline, microphone muted, performing other tasks, etc.) and assign the task of responding to the voice input to a secondary VAS. The secondary VAS may respond, "Here is today's weather from [secondary VAS] . . . ," which may let a user know that a secondary VAS (e.g., not the target VAS) is responding. In some embodiments, a VAS assignment system may determine which device to assign a task based on, e.g., availability, enabled skills, proximity, connection strength, priority of the devices, urgency of the voice input, personal preferences, and more.

In some embodiments, a voice command may be made to a first VAS that is incompatible with the requested task (e.g., requesting the VAS to turn on the kitchen lights) so a second VAS must perform the task and respond to the voice command. For example, a voice input like "[Target VAS], set the kitchen lights to 40%" is received by at least one of multiple VASs, which are in communication with a VAS assignment system. The VAS assignment system may determine that the target VAS is incompatible with the voice command given and assign performing the task and/or responding to the voice input to another device, e.g., a secondary VAS. The secondary VAS may offer a response such as, "Lights in Kitchen set to 40% by 'secondary VAS,'" which may let a user know that a secondary VAS (e.g., not the target VAS) is responding. In some embodiments, a VAS assignment system may determine which device to assign a task based on, e.g., compatibility of network-enabled devices required for performing the task of a voice command.

In some embodiments, assigning a voice assistant service based on the voice input may comprise several steps. For instance, first, the voice input may be processed with the wake word, through the processor. Thereby, at least one VAS may be assigned to output a response based on the voice input through the processor. Next, the context may be identified from the voice input, in case a primary VAS associated with the wake word is not available for service, through the context identification module. Next, the context may be classified into a plurality of segments to assign at least one segment to the VAS from the multiple VASs through the classification module. Later, at least one skill of a secondary VAS may be assessed from multiple VASs based on the segment that is required for processing the voice input through the skill assessment module. Then, permission from a user may be obtained to configure the skill, in case the assessed skill is not present in the secondary VAS, through the user permission module.

Some embodiments may comprise a scenario where a voice command is made to a first VAS that is busy and/or unavailable for the requested task (e.g., turning on outdoor lights) so a second VAS may request permission to enable a skill to perform the task. For instance, a voice input such as "Hey [target VAS], turn on the outdoor lights," may be received by at least one of multiple VAS in communication with a VAS assignment system. The VAS assignment system may determine that the target VAS is unavailable or too busy for the voice command and assign performing the task and/or responding to the voice input to a secondary VAS. Here, a secondary VAS (e.g., not the target VAS) may offer a response, "Would you like me to enable the 'Outdoor Lights Platform' skill?" requesting permission to download, configure, and/or otherwise enable a skill or service to, e.g., turn on the outdoor lights. In some embodiments, a VAS assignment system may determine which device to assign a task based on, e.g., ease of enabling and/or configuring a device that may be utilized for performing a task of a voice command. In some embodiments, a VAS assignment system may further communicate with a cloud server to enable and configure skills on a second VAS that were previously enabled and configured on a first VAS. In some embodiments, a VAS assignment system may facilitate communication of profiles and devices, e.g., the platform for the outdoor lights, between a first VAS and a second VAS in order to efficiently transfer account information and quickly perform the requested task. In some embodiments, a VAS assignment system may make such communication and/or data storage temporary.

In some embodiments, a high-urgency voice command made to a first VAS that is busy may require the first VAS's busy status to be overridden so that the first VAS performs the task and responds to the voice command. In some embodiments, the first VAS's busy status may be overridden to perform the task and/or the second VAS may respond to the voice command, e.g., since the first VAS may be busy or otherwise unavailable. For example, a voice input such as "Hey 'Target VAS,' set the Alarm System to 'Away,'" may be received by at least one of multiple VASs in communication with a VAS assignment system. The VAS assignment system may determine that the target VAS is busy/unavailable; however, with the urgent and/or high-priority nature of the voice command given, the system may assign performing the task and/or responding to the voice input to the target VAS device. Here, a target VAS may offer a response, despite being "busy," as "This is an urgent request, the Alarm System is set to 'Away' mode," which may let a user know that the target VAS (e.g., not a secondary VAS) is responding due to the urgency. For instance, commands related to security, alarms, pausing/stopping, switching off, and other potential safety-related commands may classify a command, or portion of a voice input, as a "urgent." In some embodiments, a VAS assignment system may determine urgency and/or voice input priority based on context, personal preferences, device profiles, etc. In some embodiments, a VAS assignment system may assign performance of a task to one VAS and performance of another task and/or issuing a response to another VAS.

Some embodiments may implement interaction between multiple VASs. For instance, first, a context may be identified from the voice input with the wake word which may be received from the user. Later, the context may be classified into two segments such as a generic voice input type and a target VAS-specific voice input type. Next, a partial context may be identified through the processor corresponding to the generic voice input, which is available in a primary VAS. Next, a missing context may be identified through the processor corresponding to the target VAS-specific voice input to be available in a secondary VAS. Later, after identification of the partial context and the missing context, an interaction may be established between the primary VAS and the secondary VAS through the VAS interaction module. More specifically, the interaction may be enabled between the primary VAS and the secondary VAS for collecting the missing context information from the secondary VAS by utilizing the primary VAS. Finally, the primary VAS may be assigned to process the partial context and the collected missing context through the processor.

Some embodiments may implement a sequential and parallel processing by multiple VASs. First, the context may be identified from a voice input with a wake word received from the user. Later, the context may be classified into a first segment and a second segment by the classification module. Next, the first segment may be assigned to a primary VAS and the second segment may be assigned to a secondary VAS through the processor. Next, dependency of the second segment on the first segment may be identified through the processor. If the second segment depends on the first segment, then sequential processing may be implemented. If the second segment does not depend on the first segment, then parallel processing may be implemented.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
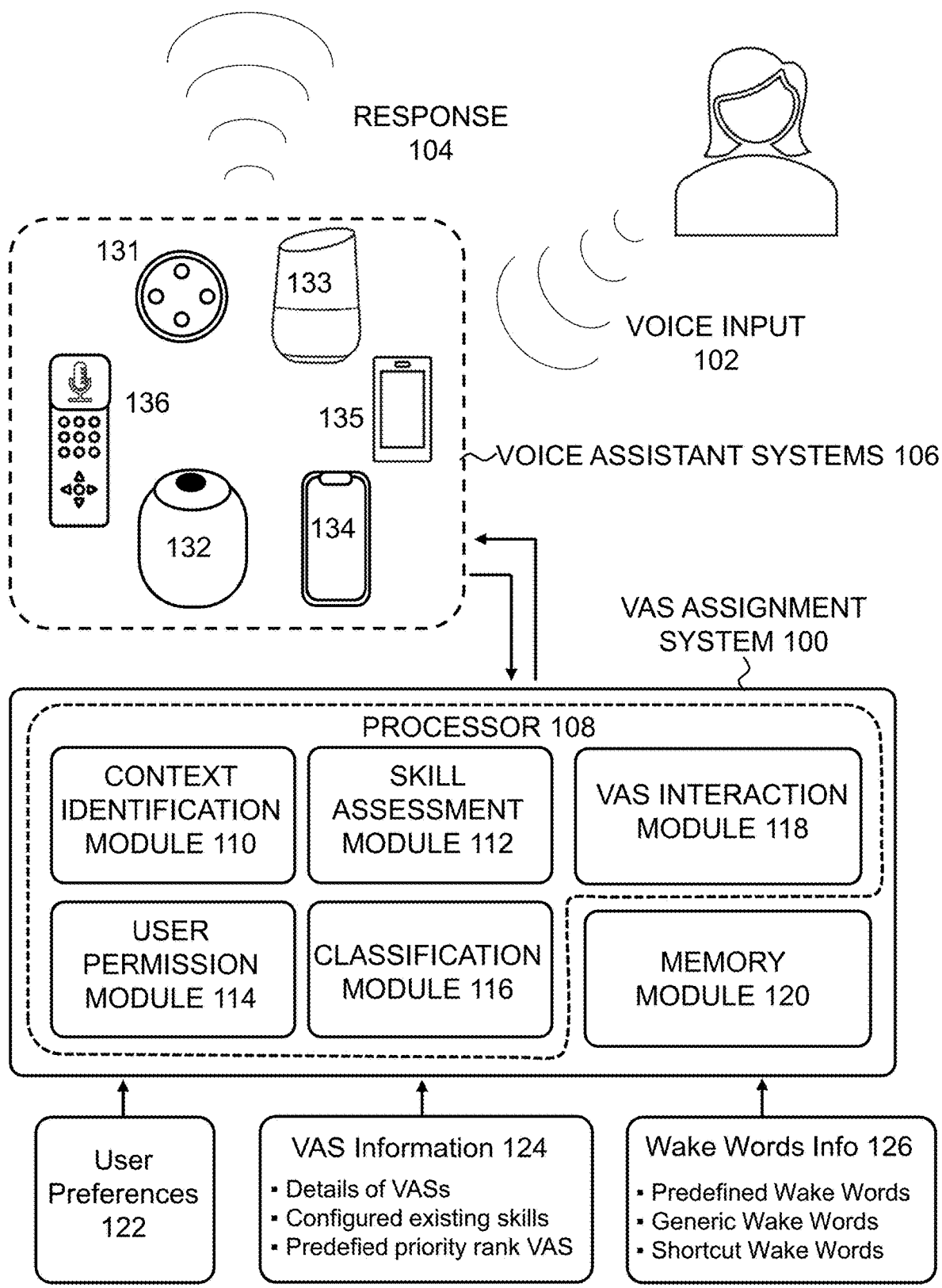
FIG. 1A depicts an illustrative system for assigning a voice assistant service (VAS) based on a voice input, in accordance with some embodiments of the disclosure.

Exemplary embodiments of the present invention will be described in reference to the accompanying drawings. Wherever possible, same or similar reference numerals are used in the drawings and the description to refer to the same or like parts or steps. Generally, VAS may refer to one or more voice assistant services, as well as virtual assistant platforms, mobile device voice control systems, network-connected microphones, voice command systems, voice remote controls, smart speaker systems, and more. A VAS may comprise various skills, features, applications, and/or services. The term "skill" as used herein may refer to a VAS skill, feature, application, service, or the like. Some skills may be features and some skills comprise services shared with other VASs. Some skills may be integrated in a VAS as default, e.g., as standard features. Some skills may be downloaded, added, enabled, configured, etc.

According to a non-limiting exemplary embodiment, FIG. 1A depicts an illustrative system 100 for assigning a voice assistant service (VAS) based on a voice input. VAS assignment system 100 comprises a processor 108 and a memory module 120. Processor 108 further comprises a context identification module 110, a skill assessment module 112, a user permission module 114, a classification module 116, and a VAS interaction module 118.

Generally, processor 108 may be configured to process at least one voice input 102 received by at least one VAS from multiple VASs 106. VASs 106 may comprise, for instance, devices 131-136. Exemplary devices 131-136 may comprise, e.g., an Amazon Echo, an Apple HomePod, a Google Home, an iPhone, a Samsung Galaxy, a SONOS speaker, and/or a voice-enable remote control for a video system with, e.g., TiVo®, Roku®, Comcast Xfinity®, Verizon Fios®, AppleTV®, Google Chromecast®, Samsung Smart TV, Vizio, LG, Sony, and others.

Voice input 102 may be provided by a user to a specific VAS with at least one wake word for accomplishing either a search query or an online task or for controlling various network-connected devices. Processor 108 may be configured to assign at least one VAS based on the voice input 102 and cause to be output a response 104 to the user.

In some embodiments, such as depicted in FIGS. 1A-E, VAS assignment system 100 will interface with VASs 106 to determine which VAS will perform a task and/or respond to a query of voice input 102 (and/or 102B-E). In some case, such as FIGS. 1B, 1D, and 1E, a VAS may be unavailable and/or busy, and a second VAS may be called upon to respond to the request. In some cases, such as FIG. 1C, a target VAS may be incompatible with the task requested to be performed. In some cases, such as FIG. 1D, a target VAS may be busy, and a secondary VAS may not have a requisite skill enabled to perform the requested task, e.g., until permission is granted. In some cases, such as FIG. 1E, a target VAS may be busy (or unavailable), but the urgent task requires the busy status to be overridden and the requested task to be performed by the target VAS.

Context identification module 110 may be configured to identify at least one context or intent from the voice input 102 in case a primary VAS associated with the wake word of the voice input 102 is not available for service. The availability of the primary VAS and (at least one) other VAS may be identified based on various conditions. Such conditions may comprise of, when the primary VAS is not present, the primary VAS is in inactive mode in home or office, the primary VAS is in DND mode, the primary VAS is in busy mode, the primary VAS is in switch off mode, the primary VAS does not have a required skill to process the voice input 102.

In some embodiments, context identification module 110 may comprise a cloud-based context or intent identification engine configured to receive a user request in form of the voice input 102 on affirmative determination, over a secured channel and identify context or intent of the user input.

Skill assessment module 112 may be configured to assess at least one skill of a secondary VAS, or other VAS from multiple VASs 106, that may be required for processing the voice input 102. The skill of the secondary VAS or other VAS may be assessed based on the identified context. Processor 108 may be configured to check the presence of the required skill in the secondary VAS.

User permission module 114 may be configured to seek permission from the user to install or configure the required skill in the secondary VAS, in case the assessed skill is not present in the secondary VAS but may be supported by the ecosystem of the secondary VAS. Based on the permission granted from the user, processor 108 can install or configure the new skill in the secondary VAS. Processor 108 may be configured to automatically install the skill based on preapproval from the user or to recommend that the user to install the skill in the secondary VAS through a voice interaction or authentication from the user.

Further, user permission module 114 may provide at least one of an audible indication, a visual indication, and requests a confirmation from the user to process the voice input 102 through the secondary VAS in case the required skill is present in the secondary VAS. The visual indication may be a small LED light. An acknowledgement sound, e.g., may be a wake-up sound or "ok," or any other short-output affirmative sound may be generated. A cloud service may send a directive to play the default affirmative sound or send an asset along with the directive to play a specific asset.

Thus, system 100 may provide an opportunity to the secondary VAS to promote its skills when the primary VAS is either not available to serve or when the primary VAS does not have required skill.

Classification module 116 may be configured to classify the identified context or intent into a plurality of segments. At least one segment may be assigned to at least one VAS from the multiple VASs 106 based on at least one user preference 122, and at least one skill and availability of the at least one VAS.

In some embodiments, the segment may comprise at least one of a generic voice input and a target VAS-specific voice input. For example, system 100 sends the voice input 102 to a secondary VAS only if voice input 102 may be classified as generic voice input. The secondary VAS may be selected based on user preferences 122, configured skills on the second VAS and pre-defined priority assigned to the secondary VAS to execute a response to a voice input 102.

The VAS-specific voice input may be identified from at least one of an urgency coefficient of the context and when a user is associated with the primary VAS, which may be identified from the context. If the primary VAS is in DND mode, the processor 108 may check urgency associated with voice input 102 and may override and disable the DND mode. For example, if the urgency coefficient is above a predetermined threshold, DND mode of the VAS may be turned off and the input processed.

In some embodiments, system 100 may identify that the user request has two or more segments, wherein a first segment may be classified as a generic voice input and a second segment may be classified as a target VAS-specific voice input. System 100 may assign the first segment to the primary VAS for processing and the second segment to a secondary VAS for processing. System 100 may similarly determine if the first segment of the user request requires a skill available on the primary VAS and the second segment of the user request requires a skill available on the secondary VAS, and accordingly assign the segments to different VASs.

In some embodiments, classification module 116 may be configured for processing the plurality of segments either in a joint command execution or in a partial command execution. In some embodiments, the joint command execution may implement a parallel processing of the segments. In some embodiments, the partial command execution implements a sequential processing of the segments.

In some embodiments, classification module 116 utilizes a trained model (e.g., a neural network) to classify voice input. For instance, training data used by the classification model may contain manually curated or feedback-loop data comprising a list of commands or comments or instructions or contexts with higher bias coefficient associated with certain nodes representing security, authentication, payment, and credential related words to classify them as VAS-specific voice input. For example, when certain words, like "payment," "credential," "authentication," etc. are detected, input may be classified as a target VAS-specific voice input. The classification logic can also consider required features, and credentials that may only be present at the intended VAS, knowing the general attributes of the intended VAS or the context.

VAS interaction module 118 may be configured to enable interaction between multiple VASs 106. VAS interaction module 118 facilitates the VASs to share information between each other to further process the voice input 102 with the segments. This allows the VASs to operate in a collaborative and secure manner without seeking information from the user.

For example, if a primary VAS has some information about the user, and if the secondary VAS requires such information to process the user request, system 100 may allow the primary VAS to share the information instead of requesting the required information from the user. The secondary VAS cloud service may send an API call to the primary VAS cloud server with identified partial context or intent and request for missing information. System 100 may provide a coordinated response and minimize user involvement. System 100 may either receive the input from another VAS or assign the task to other VAS. In some embodiments, system 100 may have a common format or template for representing the context or intent. System 100 may also maintain mapping of the intent between different VASs.

In some embodiments, system 100 enables an ecosystem where multiple VASs 106 are aware of coexistence of other VASs and know the capability of other VASs. This ecosystem can be used to better serve the user in a collaborative manner, but without disrupting tasks and interests of other ecosystems. Such a collaborative platform does not typically allow users to configure all the connected devices such as a TV, refrigerator, door camera, music player, etc., to be compliant with the multiple VASs ecosystem.

For example, if a TV is configured to take command from a VAS such as Siri, and user says, "Hey Alexa, switch on the TV," system 100 can still process the user request to control the TV. System 100 may allow the secondary VAS to opportunistically upsell its skills when the primary VAS is not present or busy. Further, the VASs may charge the user for each skill or feature that the user adds or enables.

In some embodiments, processor 108 may be configured to recognize at least one generic wake word that is commonly associated with multiple VASs 106, identify at least one context of the voice input 102, and assign at least one VAS from the multiple VASs 106 based on at least one user preference 122, a last processed similar voice input 102, and at least one skill and availability of the at least one VAS.

In some embodiments, system 100 may leverage connected home technology, e.g., where all VASs are associated with a home long-term or permanently, and enable VASs to process the user input in a collaborative and secure manner. The long-term associated VASs are those that relate to the residents or trusted friends or family or visitors of a house or office. The long-term associated VASs include portable and non-portable VASs. For example, the long-term and/or permanently associated VASs may include smart assistance devices like Alexa, Google Home, portal, etc. installed in the home and smart assistance services available on handheld devices of its residents. System 100 also keeps track of currently present VASs in the house or office and status of the long-term and/or permanently associated VASs such as DND, power on/off, busy, etc.

In some embodiments, system 100 may maintain a list of recognized wake words across the long-term associated VASs and mapping of each of the VASs' wake words with associated primary VAS. On receiving a user voice input 102, system 100 may determine the presence of the wake word, check if the primary VAS associated with the voice input 102 is present within the home or office network and route the voice input 102 to the primary VAS for processing if the primary VAS is present in the home or office environment and is not set in the DND mode.

In some embodiments, system 100 maintains list of skill sets available on the long-term associated VASs, and on receiving the user request through the voice input 102, system 100 checks if the primary VAS has the required skills to process the user request.

Memory module 120 may be configured for storing data 124 of multiple VASs, a list of recognized wake words 126 associated with the multiple VASs 106, a list of skills associated with the multiple VASs 106, at least one generic wake word, a list of recognized intents, and details of the primary user associated with the primary VAS. The data of multiple VASs 124 comprises details of each VAS connected to system 100, configured existing skills and user information of each VAS, and pre-defined priority ranking of VASs for command execution. The wake-word information 126 may include predefined wake words, generic wake words, and/or shortcut wake words.

Processor 108 may be at least one of, e.g., a single processer, a plurality of processors, multiple homogeneous or heterogeneous cores, multiple Central Processing Units (CPUs) of different kinds, microcontrollers, special media, and other accelerators. Processor 108 may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

Figure 1B:
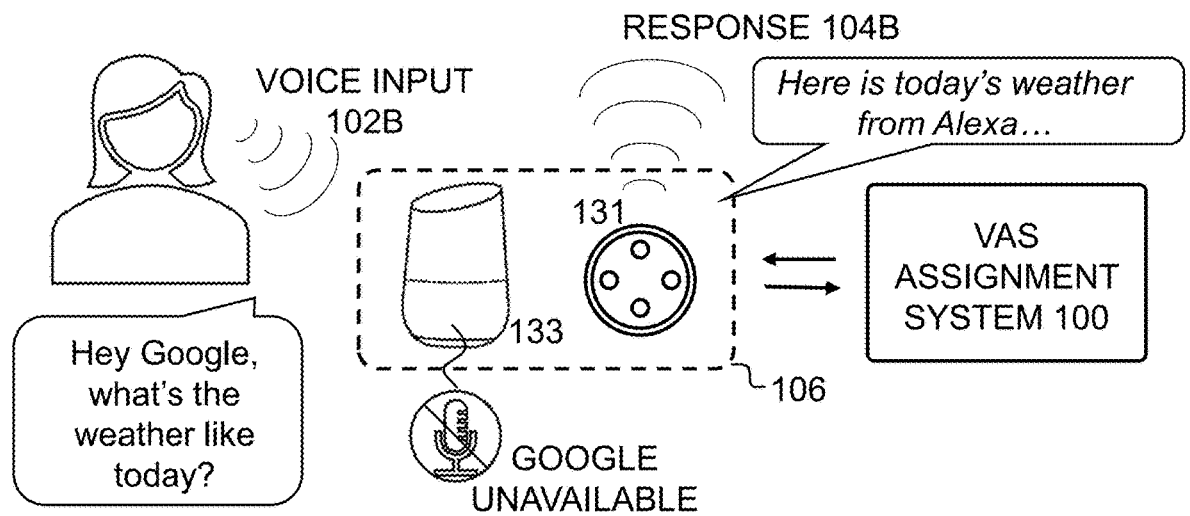
FIG. 1B depicts an illustrative system for assigning a VAS based on a voice input, in accordance with some embodiments of the disclosure.

FIG. 1B depicts an illustrative system for assigning a VAS based on a voice input, in accordance with some embodiments of the disclosure. For instance, FIG. 1B depicts a voice query made to an unavailable first VAS where a second VAS responds to the voice query. In FIG. 1B, voice input 102B, e.g., "Hey Google, what's the weather like today?," is received by at least one of VASs 106, which is in communication with VAS assignment system 100. VAS assignment system 100 may determine that the target VAS, e.g., Google Home device 133, is unavailable and/or busy, and assign the task of responding to voice input 102B to device 131, e.g., an Amazon Echo. Here, device 131 offers response 104B, "Here is today's weather from Alexa . . . ," which may let a user know that a secondary VAS (e.g., not the target VAS) is responding. In some embodiments, VAS assignment system 100 may determine which device to assign a task based on, e.g., availability, enabled skills, proximity, connection strength, priority of the devices, urgency of the voice input, personal preferences, etc.

Figure 1C:
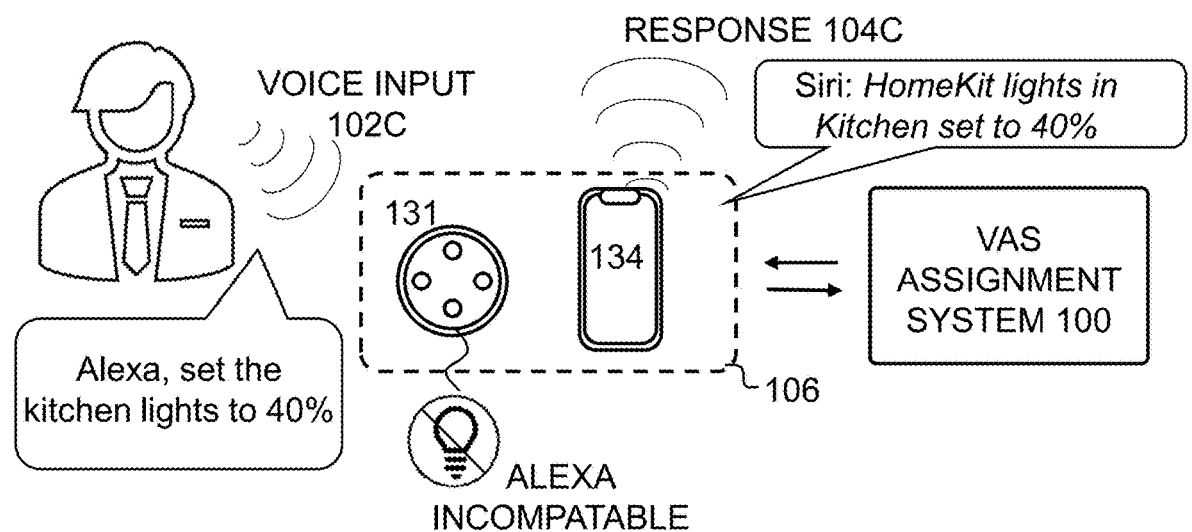
FIG. 1C depicts an illustrative system for assigning a VAS based on a voice input, in accordance with some embodiments of the disclosure.

FIG. 1C depicts an illustrative system for assigning a VAS based on a voice input, in accordance with some embodiments of the disclosure. For example, FIG. 1C depicts a voice command made to a first VAS that is incompatible with the requested task (e.g., turning on kitchen lights), so a second VAS performs the task and responds to the voice command. In FIG. 1C, voice input 102C, e.g., "Alexa, set the kitchen lights to 40%," is received by at least one of VASs 106, which is in communication with VAS assignment system 100. VAS assignment system 100 may determine that the target VAS, e.g., Amazon Echo device 131, is incompatible with the voice command given and assign performing the task and/or responding to voice input 102C to device 134, e.g., an iPhone. Here, device 134 offers response 104C, by Siri, "HomeKit lights in Kitchen set to 40%," which may let a user know that a secondary VAS (e.g., not the target VAS) is responding. In some embodiments, VAS assignment system 100 may determine which device to assign a task based on, e.g., compatibility of network-enabled devices required for performing the task of a voice command.

Figure 1D:
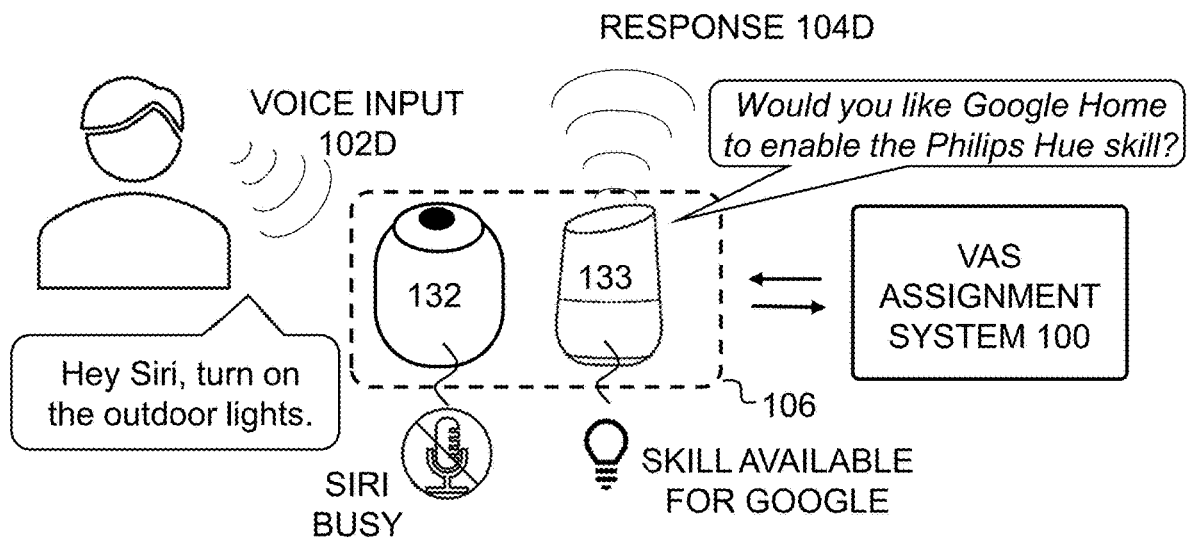
FIG. 1D depicts an illustrative system for assigning a VAS based on a voice input, in accordance with some embodiments of the disclosure.

FIG. 1D depicts an illustrative system for assigning a VAS based on a voice input, in accordance with some embodiments of the disclosure. For instance, FIG. 1D depicts a voice command made to a first VAS that is busy and/or unavailable for the requested task (e.g., turning on outdoor lights) so a second VAS requests permission to enable a skill to perform the task. In FIG. 1D, voice input 102D, e.g., "Hey Siri, turn on the outdoor lights," is received by at least one of VASs 106, which is in communication with VAS assignment system 100. VAS assignment system 100 may determine that the target VAS, e.g., Apple HomePod device 132, is unavailable or too busy for the voice command and assign performing the task and/or responding to voice input 102D to device 133, e.g., a Google Home device. Here, device 133 offers response 104C, "Would you like Google Home to enable the Philips Hue skill?" requesting permission for a secondary VAS (e.g., Google Home, not the target VAS, Apple's Siri) to enable a skill to, e.g., turn on the outdoor lights. In some embodiments, VAS assignment system 100 may determine which device to assign a task based on, e.g., ease of enabling and/or configuring a device that may be utilized for performing a task of a voice command. In some embodiments, VAS assignment system 100 may communicate with a cloud server to enable and configure skills on a second VAS that were previously enabled and configured on a first VAS. In some embodiments, VAS assignment system 100 may facilitate communication of profiles and devices, e.g., Philips Hue lights, between a first VAS and a second VAS in order to efficiently transfer account information and quickly perform the requested task. In some embodiments, such communication and data storing by VAS assignment system 100 may be temporary.

Figure 1E:
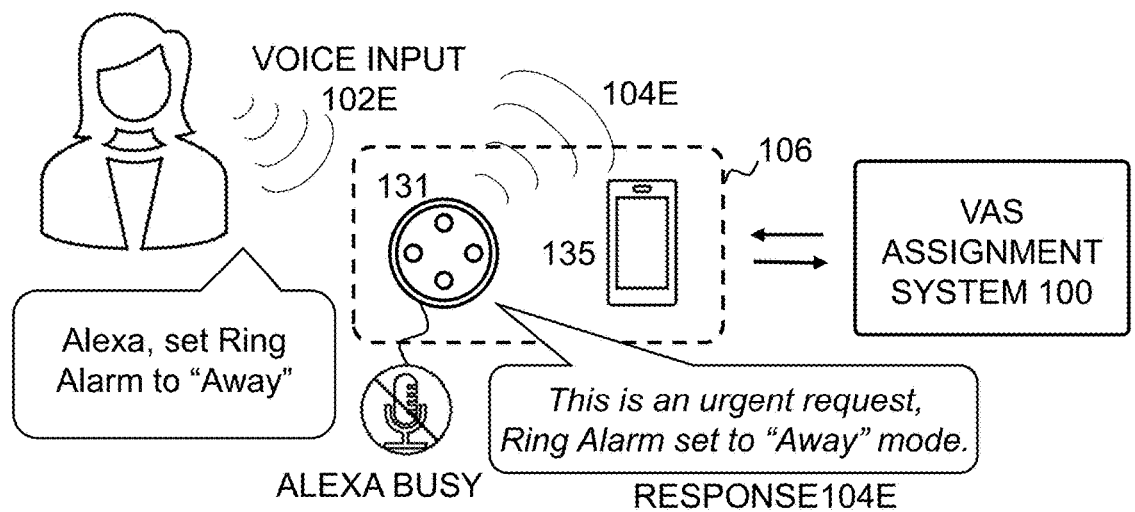
FIG. 1E depicts an illustrative system for assigning a VAS based on a voice input, in accordance with some embodiments of the disclosure.

FIG. 1E depicts an illustrative system for assigning a VAS based on a voice input, in accordance with some embodiments of the disclosure. For example, FIG. 1C depicts a high-urgency voice command made to a first VAS that is busy, but the urgency/priority is high, so the first VAS's busy status is overridden, and the first VAS performs the task and responds to the voice command. In some embodiments, the first VAS's busy status may be overridden to perform the task and the second VAS may respond to the voice command, e.g., since the first VAS may be busy or otherwise unavailable. In FIG. 1E, voice input 102E, e.g., "Alexa, set Ring Alarm to 'Away,'" is received by at least one of VASs 106, which is in communication with VAS assignment system 100. VAS assignment system 100 may determine that the target VAS, e.g., Amazon Echo device 131, is busy/unavailable, however with the urgent and/or high-priority nature of the voice command given, system 100 may assign performing the task and/or responding to voice input 102C to device 131 (not device 135, e.g., an Android Phone). Here, device 131 offers response 104C, despite being "busy," as "This is an urgent request, Ring Alarm set to 'Away' mode," which may let a user know that the target VAS (e.g., not a secondary VAS) is responding due to the urgency. For instance, commands related to security, alarms, pausing/stopping, switching off, and other potential safety-related commands may classify a command, or portion of a voice input, as a "urgent." In some embodiments, VAS assignment system 100 may determine urgency and/or voice input priority based on context, personal preferences, device profiles, etc. In some embodiments, VAS assignment system 100 may assign performance of a task to one VAS and performance of another task and/or issuing a response to another VAS.

Figure 2:
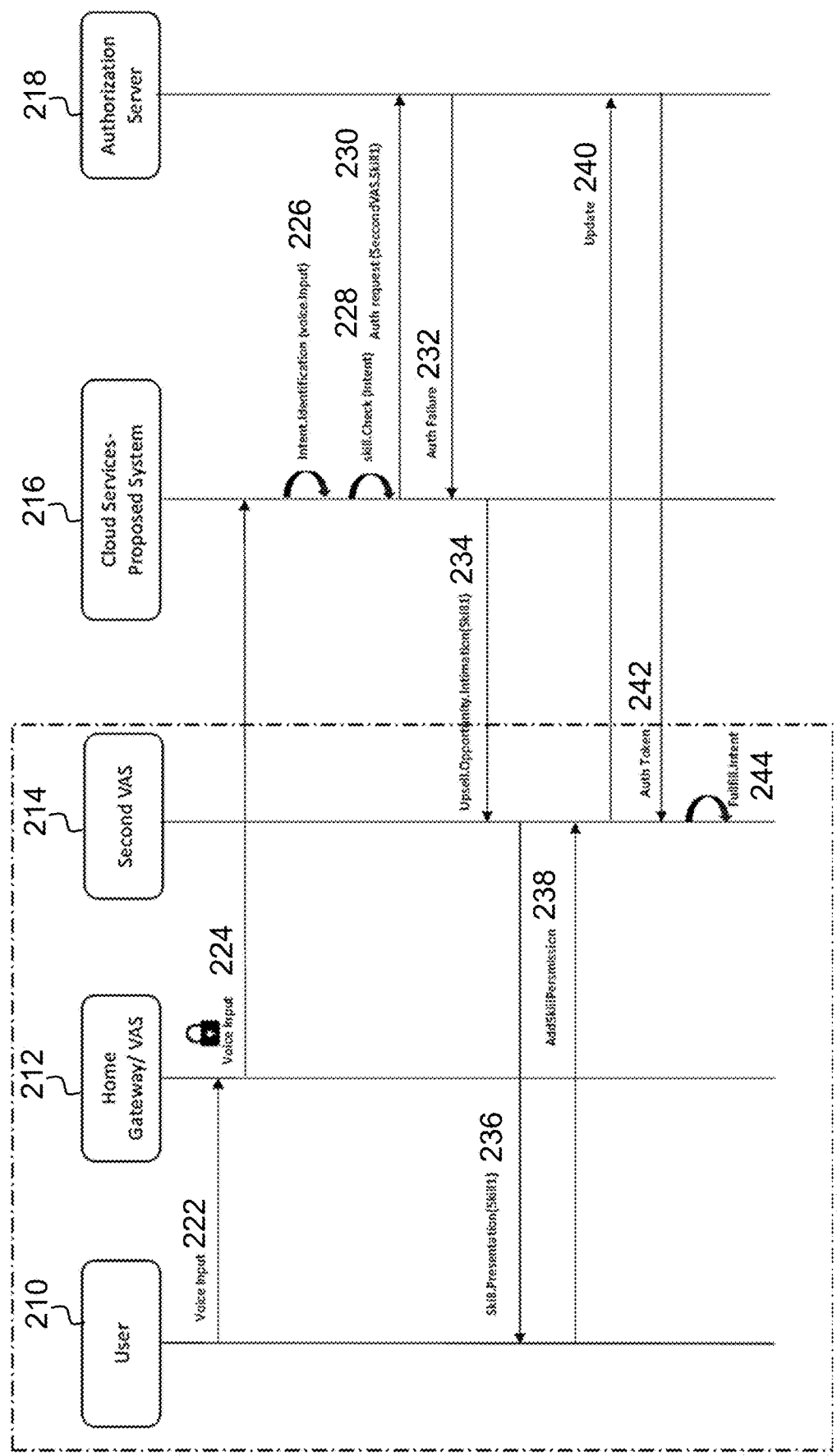
FIG. 2 depicts a message flow diagram for a required skill configuration, in accordance with some embodiments of the disclosure.

According to another non-limiting exemplary embodiment, FIG. 2 depicts a message flow diagram for a required skill configuration. Once the context or a fully resolved context or a partially resolved intent may be identified 226 from a voice input 222, system 216 may determine if the user 210 or home gateway 212 is authorized to access skill of a second VAS 214. The voice input 224 may be sent from the home gateway or VAS 212 to system 216. System 216 may determine a best matching context from a list of recognized contexts of the presently available VASs. System 216 may utilize existing context or intent matching logics. For each context, system 216 may maintain utterances across all VASs. System 216 in the backend keeps polling for each context, all new utterances that may have been added by any of the present VASs.

Further, a required skill, feature, application, or service pack on the secondary VAS 214 to process the matching context can be determined by checking user subscribed skills or features 228 or services on the secondary VAS 214. Before assigning the task to the secondary VAS 214 having a required skill, system 216 may request 230 authorization server 218 to provide an o-auth token 242 for accessing the required skill or service of the second VAS 214. If the user 210 doesn't have permission to use the required skill or feature, the authorization server 218 indicates auth failure 232, and system 216 may upsell the skill or features to the user 210.

In some embodiments, system 216 may just pass the indication or opportunity to the secondary VAS 214 to upsell the skill 234 based on non-availability of the primary VAS for service related to the identified context or intent 226, and the rest of the user interaction can be managed by the secondary VAS 214. For example, Alexa, e.g., a secondary VAS 214 in this case, can handle the transaction including presenting skill description 236, pricing, and concluding purchase. System 216 may use voice interaction feature of the second VAS 214 to seek user permission through an interaction such as the one given below.

Secondary VAS 214: Would you like Alexa (secondary VAS) to take this task related to the identified context 226?

User 210: Yes

Secondary VAS 214: You need to install Skill-1 on the Secondary VAS 214 to complete this task and the Skill costs 0.5 USD. Should I install?

User 210: Yes

Secondary VAS 214: Added Skill-1 238

The information of an added skill may be updated 240 to the authorization server 218. Further, the intent may be fulfilled 244 by the secondary VAS 214.

Similarly, for enabling services (e.g., similar to a skill in Alexa) on Google Home, system 216 sends the indication to Google to promote the particular service. Google Home can manage the rest of the interaction to add the service through voice interaction.

Further, system 216 may use standard software to discover VASs and to enable intercommunication between the VASs. The software may provide interoperability among smart home devices and IoT platforms from different providers. Using the software, it will be easy to convey intent/partially resolved intent from one VAS to another and get required data to process the user request.

Figure 3:
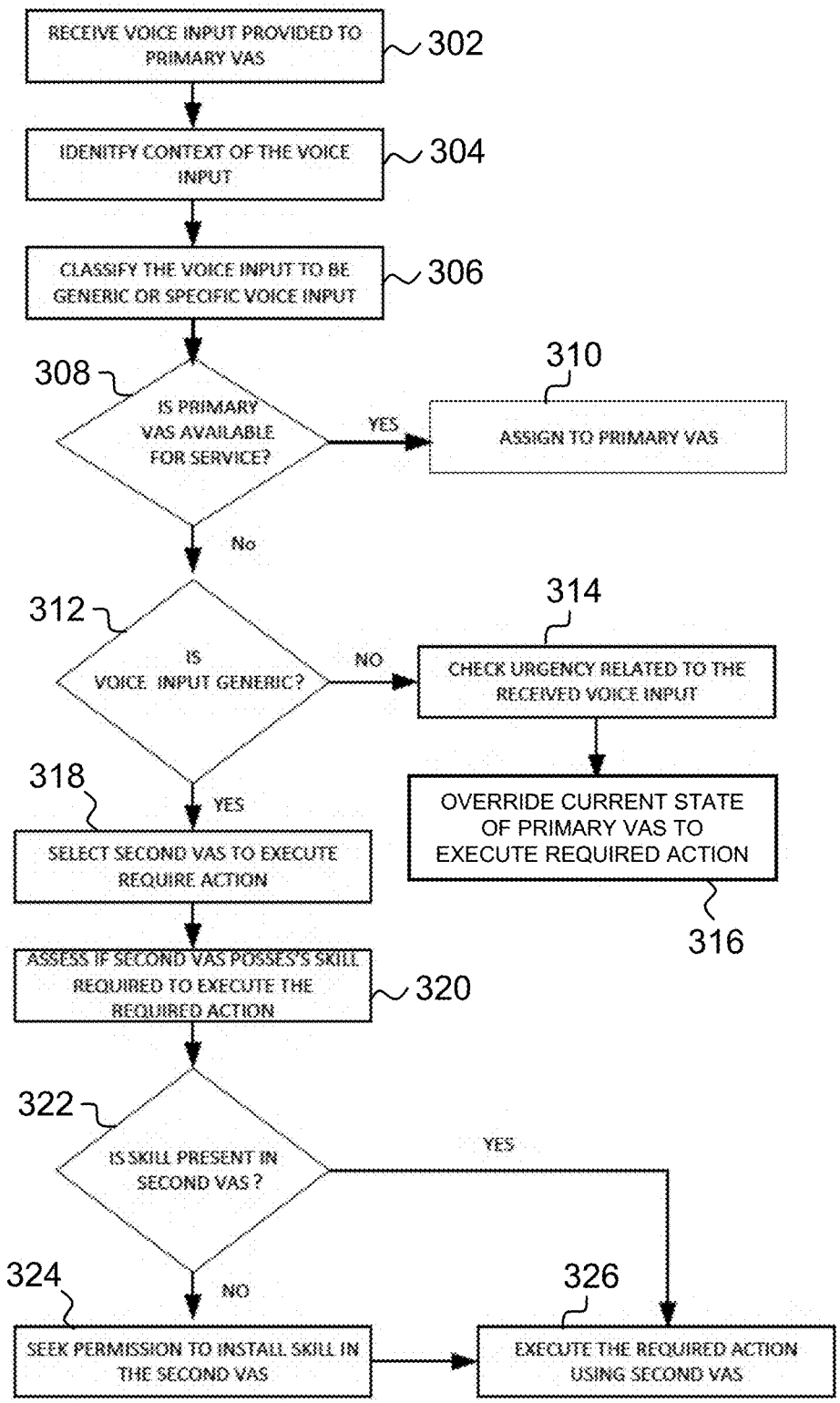
FIG. 3 depicts an exemplary method for assigning a VAS based on context of the voice input, in accordance with some embodiments of the disclosure.

According to another non-limiting exemplary embodiment, FIG. 3 depicts an exemplary method 300 for assigning a VAS based on context of the voice input. The method 300 discloses receiving a voice input from the user, which may be provided to a primary VAS, as depicted in step 302. Thereafter, the method 300 discloses identifying, by the context identification module, context of the voice input, as depicted in step 304. Subsequently, classification of the voice input may be carried out by the classification module 116, which may classify the voice input to be either generic voice input or a target VAS specific voice input, as depicted in step 306.

At step 308, verification may be done to check whether the primary VAS is available for service. At step 310, the classified voice input may be assigned to the primary VAS, in case the primary VAS is available for service. Otherwise, the system may check whether the voice input was classified as a generic voice input, as depicted in step 312. If the voice input is a target VAS specific voice input, then at step 314, the urgency related to the voice input may be checked. If the voice input is determined to be urgent, at step 316, the current state of the primary VAS may be overridden for execution of a required action. At step 318, the second VAS may be selected to execute the required action in case the voice input is a generic voice input.

At step 320, the secondary VAS may be assessed for availability of at least one skill required to execute the required action, through the skill assessment module. At step 322, verification may be done to check whether the required skill is present in the secondary VAS. At step 326, the required action may be executed utilizing the secondary VAS, in case the skill is present in the secondary VAS. If the required skill is not present in the secondary VAS then, at step 324, permission may be obtained from the user to install or configure the required skill through the user permission module. Based on the granted permission, the required action may be executed utilizing the secondary VAS, at step 326.

Figure 4:
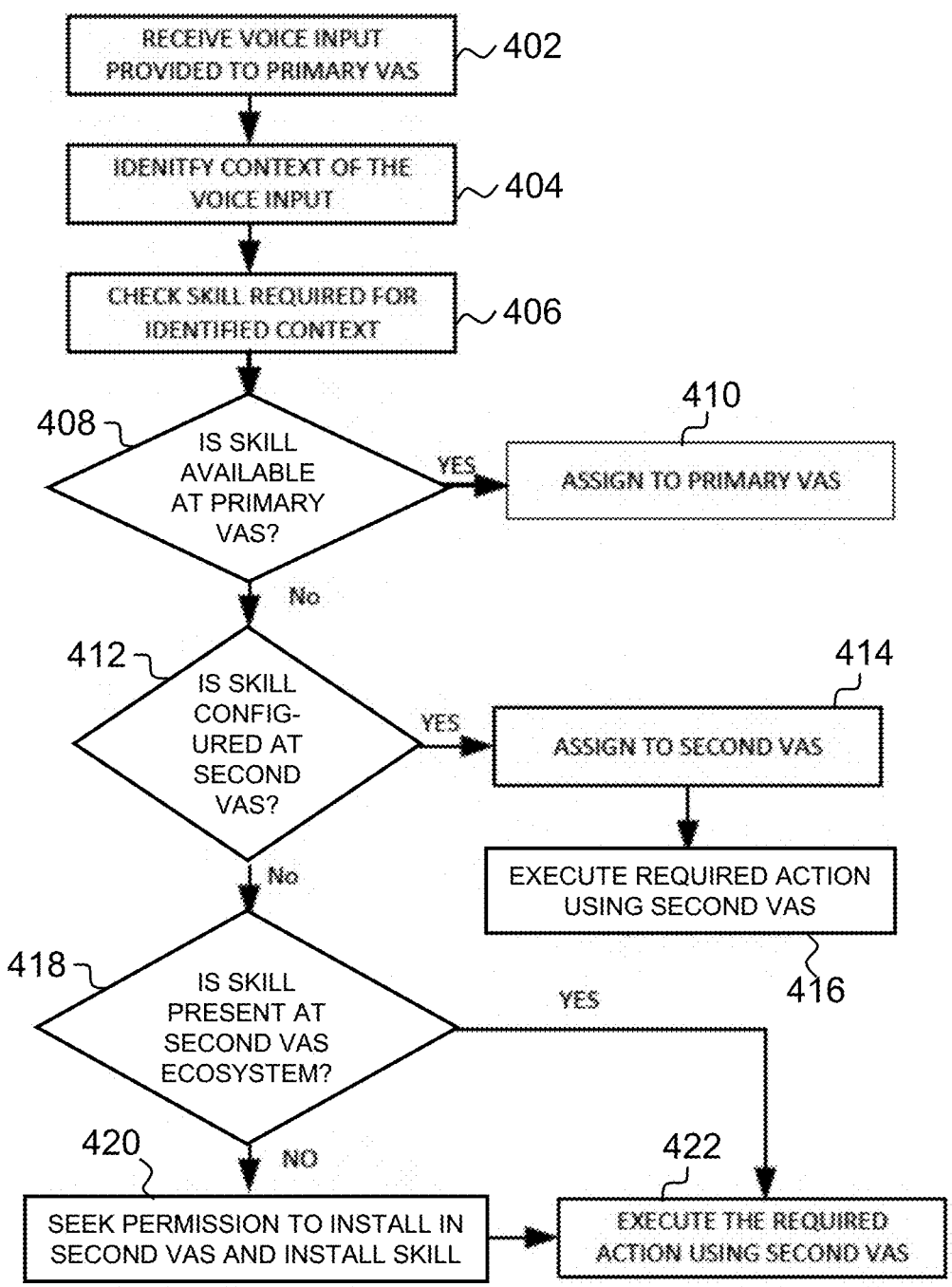
FIG. 4 depicts a method for assigning a VAS with skill configuration, in accordance with some embodiments of the disclosure.

According to another non-limiting exemplary embodiment, FIG. 4 depicts a method 400 for assigning a VAS with skill configuration. At step 402, at least one voice input may be received from the user and provided to the primary VAS. At step 404, a context from the voice input may be identified through the context identification module 110. At step 406, after identification of the context, at least one skill required for the identified context may be checked. At step 408, availability of the required skill may be checked at the primary VAS. If the required skill is available at the primary VAS then, at step 410, the primary VAS may be assigned to process the identified context through the processor.

If the required skill is not available at the primary VAS then, at step 412, availability of the required skill may be checked at the secondary VAS. If the required skill is available at the secondary VAS then, at step 414, the secondary VAS may be assigned to process the identified context through the processor. Then, based on the availability of the skill at the secondary VAS the required action may be executed utilizing the secondary VAS, at step 416.

If the required skill is available at the secondary VAS then, at step 418, it may be checked whether the required skill is available within the eco-system of the secondary VAS. If the required skill is available within the eco-system of the secondary VAS then, at step 422, the required action may be executed utilizing the secondary VAS. If the required skill is not available within the eco-system of the secondary VAS then, at step 420, permission may be sought and obtained from the user to install or configure the required skill through the user permission module. Then, based on the granted permission, the required action may be executed utilizing the secondary VAS, at step 422.

Figure 5:
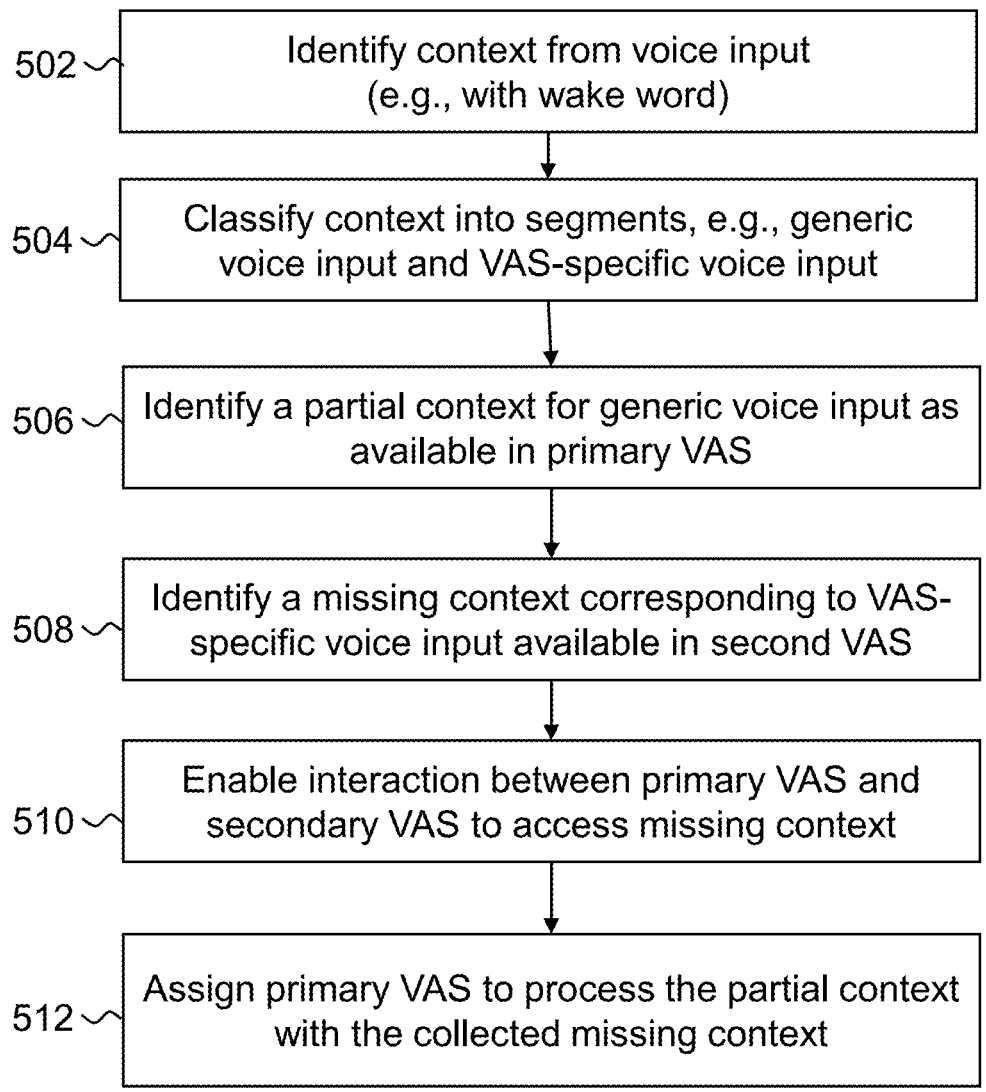
FIG. 5 depicts a method for implementing interaction between multiple VASs, in accordance with some embodiments of the disclosure.

According to another non-limiting exemplary embodiment, FIG. 5 depicts a method 500 for implementing interaction between multiple VASs. At step 502, a context may be identified from the voice input with the wake word received from the user, using the context identification module. At step 504, the context may be classified into two segments such as a generic voice input and a VAS-specific voice input, using the classification module. At step 506, a partial context corresponding to the generic voice input may be identified as available in a primary VAS, using the processor. At step 508, a missing context corresponding to the VAS-specific voice input may be identified as available in a secondary VAS, using the processor.

After identification of the partial context and the missing context, an interaction may be established between the primary VAS and the secondary VAS through the VAS interaction module, at step 510. More specifically, the interaction may be enabled between the primary VAS and the secondary VAS for collecting the missing context information from the secondary VAS by the primary VAS. At step 512, the primary VAS may be assigned to process the partial context and the collected missing context through the processor.

Figure 6A:
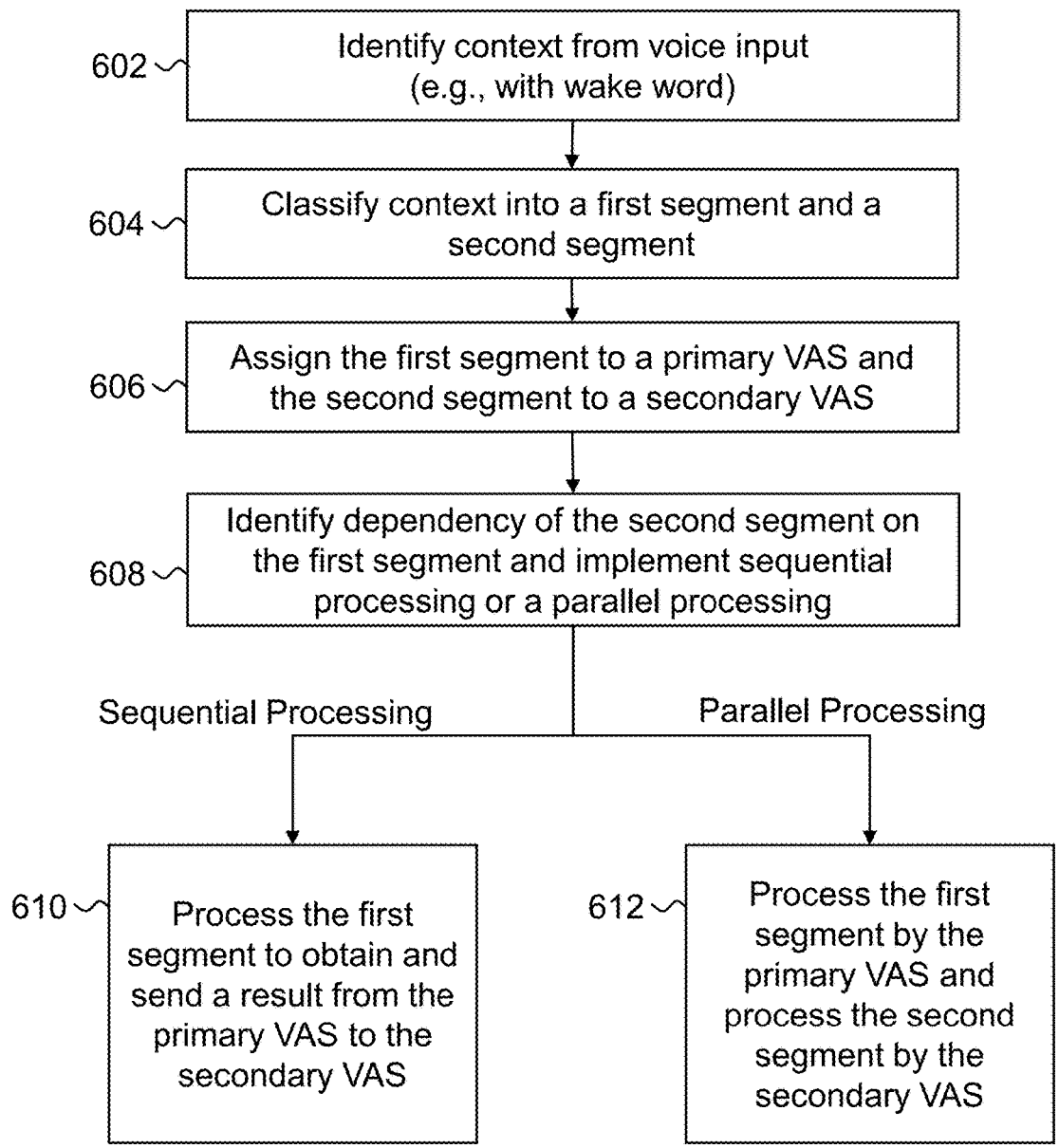
FIG. 6A depicts a method for implementing a sequential and parallel processing by multiple VASs, in accordance with some embodiments of the disclosure.

According to another non-limiting exemplary embodiment, FIG. 6A depicts a method 600 for implementing a sequential and parallel processing by multiple VASs. At step 602, the context may be identified from a voice input with a wake word received from the user using the context identification module. At step 604, the context may be classified into a first segment and a second segment by the classification module. At step 606, the first segment may be assigned to a primary VAS and the second segment may be assigned to a secondary VAS, through the processor. At step 608, dependency of the second segment on the first segment may be identified through the processor. More specifically, if the second segment depends on the first segment then a sequential processing may be implemented. Otherwise, a parallel processing may be implemented.

In case the second segment depends on the first segment, then, at step 610, the first segment may be processed by the primary VAS and a result may be obtained after processing through the processor. Then, the obtained result may be transmitted from the primary VAS to a secondary VAS. Thereby, the sequential processing of the second segment and the obtained result by the secondary VAS may be accomplished.

In case no dependency exists between the first segment and the second segment, then, at step 612, the first segment may be processed by the primary VAS and simultaneously, the second segment may be also processed by the secondary VAS to accomplish the parallel processing.

Figure 6B:
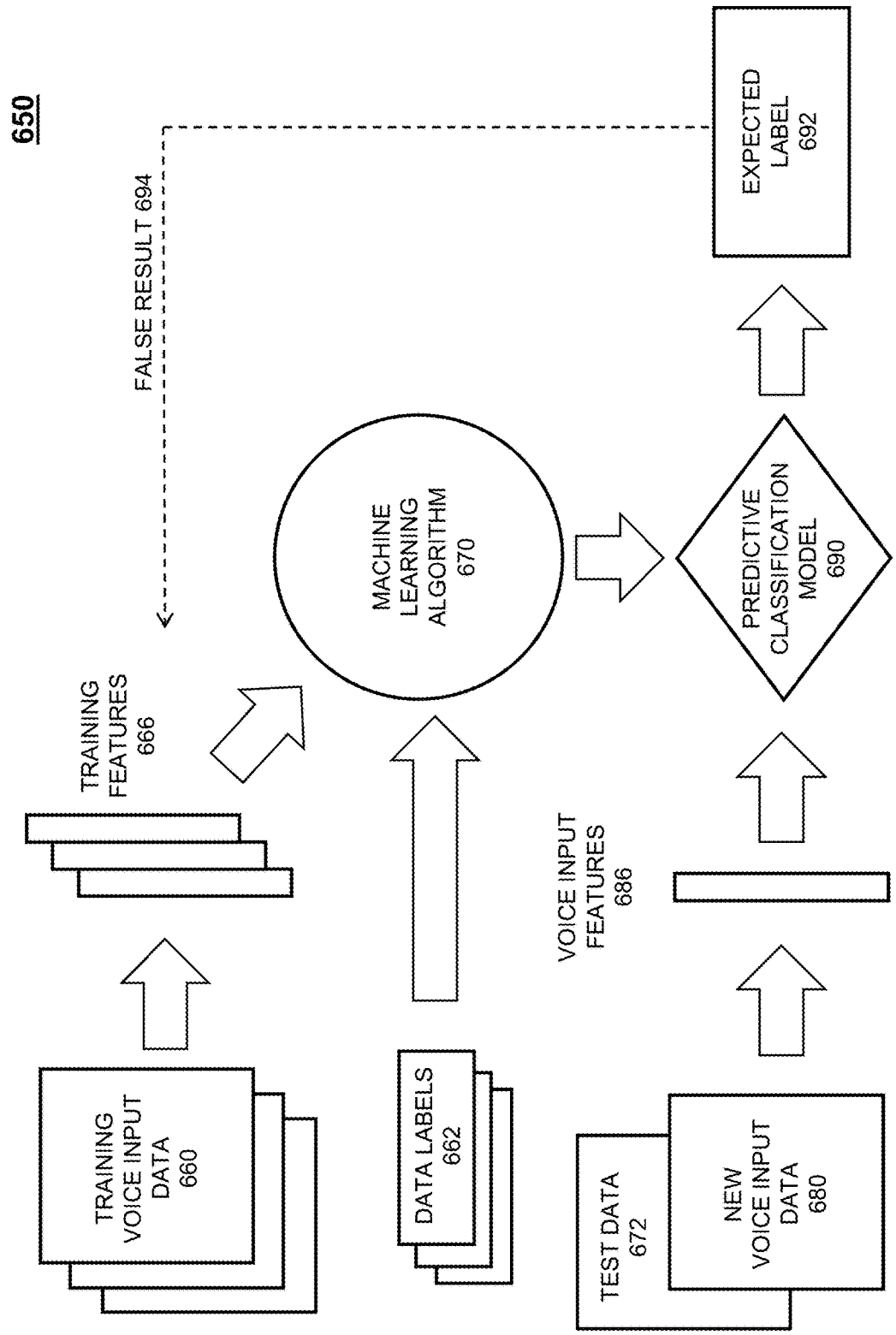
FIG. 6B depicts an illustrative flow diagram of a process for training a machine learning model to classify a segment of voice input, in accordance with some embodiments of the disclosure.

FIG. 6B depicts an illustrative flow diagram of a process for training a machine learning model to classify a segment of voice input, in accordance with some embodiments of the disclosure. In some embodiments, classifying voice input data of a home network may be accomplished with predictive modeling. Generally, a trained neural network may be used to classify voice input data as, e.g., generic voice input or voice input specific to a target VAS. For instance, certain voice commands may be VAS-specific while other commands may be performed by any available VAS. In some embodiments, a training set comprising voice input data with predetermined classification labels may be used by a neural network to be trained to classify as generic or specific. In some embodiments, a neural network trained to classify voice input data may be a component of a classification module. In some embodiments, a classification module may separate voice input into voice input segments to be input into the trained model and classified as, e.g., generic or specific.

Training a neural network to accurately cluster and/or predict categories may be accomplished in many ways. Some embodiments may use supervised learning where, e.g., a training data set includes labels of, e.g., generic voice input or VAS-specific voice input. Some embodiments may use unsupervised learning that may classify and/or cluster similar data. Some embodiments may use semi-supervised learning where a portion of labeled voice input data may be combined with unlabeled voice input data during training. In some embodiments, a reinforcement learning technique may be used. With reinforcement learning, a predictive model is trained from a series of actions by maximizing a "reward function," via rewarding correct labeling and penalizing improper labeling. Scenario 650 includes data labels 662, indicating a supervised or semi-supervised learning situation. A trained neural network may return a category label describing the input voice input data or may simply cluster the input voice input data with learned similarities.

Scenario 650 depicts training voice input data 660 along with data labels 662. Training data for voice input data classifying may be collected by manually labeling training voice input data that indicate categories, e.g., generic or VAS-specific. In some embodiments, voice input data may comprise one or more voice input segments, and each segment may be classified individually. Voice input data without classifications, e.g., from a control group, may also be captured and used. In some circumstances, an analyst may mark incoming voice input data with a label of a category or characteristic, e.g., in near-real time, to create the training data set. From the voice input data collected, at least two groups of data may be created: training voice input data 660 and test data 672.

In scenario 650, training voice input data 660 is pre-processed using feature extraction to form training voice input data features 666. Pre-processing of training data is used to obtain proper data for training.

After pre-processing, training features 666 are fed into Machine Learning Algorithm (MLA) 670 to generate an initial machine learning model, e.g., predictive classification model 690. In some embodiments, MLA 670 uses numbers between 0 and 1 to determine whether the provided data, e.g., training features 666, fits a certain category or not. The more data that is provided, the more accurate MLA 670 will be in creating a model, e.g., predictive classification model 690.

Once MLA 670 creates predictive classification model 690, test data 672 may be fed into the model to verify the system and test how accurately model 690 behaves. In some embodiments, test data 672 is pre-processed to become voice input features 686 and passed to predictive classification model 690 for a classification. Predictive classification model 690 labels the input test data with a classification, e.g., generic or VAS-specific. In some embodiments, each iteration of test data 672 is classified and reviewed for accuracy. For example, if expected label 692 is not correct, false result 694 may be fed as learning data back into MLA 670. If, after test data 672 is classified and reviewed, model 690 does not perform as expected (e.g., with a goal of an error rate below 5%) then additional training data may be provided until the model meets the expected criteria. In some embodiments, a reinforcement learning method may be incorporated with test data to reward or punish MLA 670.

Once predictive classification model 690 works as expected, new real-time voice input data may be fed to the model, and determinations of a classification may be predicted with confidence. For instance, in scenario 650, new voice input data 680 may be pre-processed as a voice input feature 686 and passed to predictive classification model 690 for a prediction. Predictive classification model 690 may evaluate voice input feature 686 and present a label of generic input or VAS-specific input for the data. If new voice input data 680 can be verified outside the system, predictive classification model 690 may be further updated with feedback and reinforcement for further accuracy.

Figure 7:
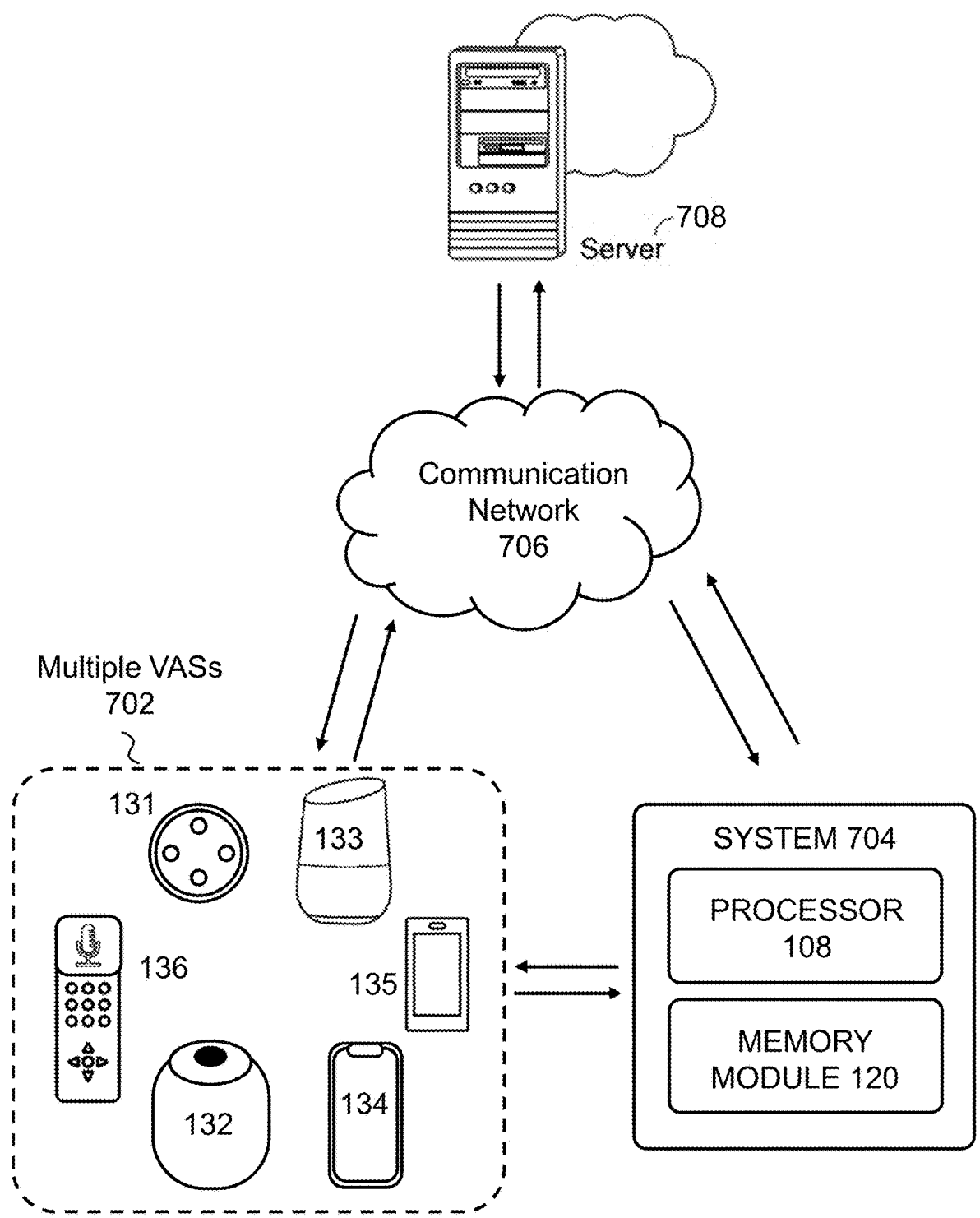
FIG. 7 depicts an exemplary block diagram with a server communication, in accordance with some embodiments of the disclosure.

According to another non-limiting exemplary embodiment, FIG. 7 depicts an exemplary block diagram 700 with a server communication. As depicted in the figure, multiple VASs 702 are connected wirelessly and are configured in system 704. The inputs received by at least one VAS are processed by system 704. System 704 communicates with the server 708 to process and execute the data received from system 704.

More specifically, processor 108 may be configured to execute instructions stored in the memory module 120 as well as communicate with the server 708 via at least one communication network 706. System 704 in turn may manage multiple VASs 702 in a collaborative manner and assign an appropriate VAS based on context of the voice input. The server 708 disclosed in the embodiment may be either a local server or a remote server. The server 708 may also be a cloud server that can be accessed through the communication network 706. Further, a database may be configured to store the processed data of the server 708, which comprises information related to system 704.

In some embodiments, the database may be used as either a stand-alone device or integrated fully or partially into system 704 and the server 708. The database may be distributed with one portion provided on system 704 and the other portion provided on the server 708. The database may also be a cloud database that can be accessed through the communication network 706.

Some embodiments may support a skill(s) of an alternative VAS when the primary VAS may be unavailable or when the primary VAS does not possess the required skill. Some embodiments may evaluate skills required to process a user request based on the context/intent. The system may distribute data related to a context/intent among various VASs. Some embodiments may classify the voice input as generic voice input or target VAS-specific voice input by utilizing a machine learning technology.

Some embodiments may perform joint commands and/or instructions, as well as partial execution, by multiple VASs. Some embodiments may override DND mode, if the voice input indicates urgency and may be initiated by the primary user associated with primary VAS. Some embodiments may install and/or configure a new VAS skill, e.g., based on a user's request(s). Further, data can be shared relating to a context across multiple VASs, e.g., to accomplish user requests made to a busy and/or unconfigured VAS.

Figure 8:
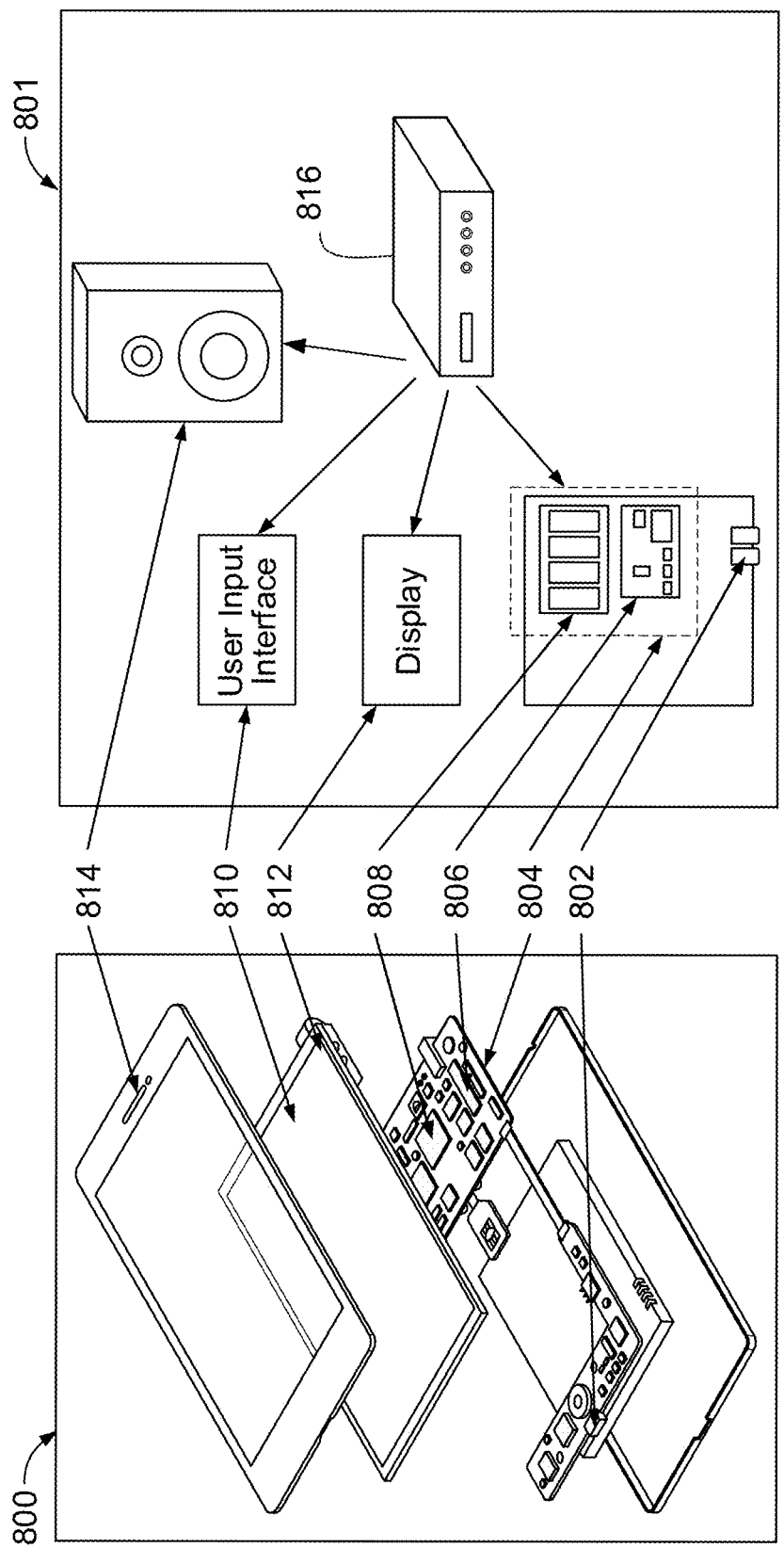
FIG. 8 is a diagram of illustrative devices, in accordance with some embodiments of the disclosure.

FIG. 8 is a diagram of illustrative devices, in accordance with some embodiments of the disclosure. Device 800 may be implemented by a device or system, e.g., a device providing a display to a user, or any other suitable control circuitry configured to generate a display to a user of content. For example, device 800 of FIG. 8 can be implemented as equipment 801. In some embodiments, equipment 801 may include set-top box 816 that includes, or is communicatively coupled to, display 812, audio equipment 814 (e.g., speakers or headphones), microphone 816, camera 818, and user input interface 810. In some embodiments, display 812 may include a television display or a computer display. In some embodiments, user interface input 810 is a remote-control device. Set-top box 816 may include one or more circuit boards. In some embodiments, the one or more circuit boards include processing circuitry, control circuitry, and storage (e.g., RAM, ROM, Hard Disk, Removable Disk, etc.). In some embodiments, circuit boards include an input/output path. Each one of device 800 and equipment 801 may receive content and receive data via input/output (hereinafter "I/O") path 802. I/O path 802 may provide content and receive data to control circuitry 804, which includes processing circuitry 806 and storage 808. Control circuitry 804 may be used to send and receive commands, requests, and other suitable data using I/O path 802. I/O path 802 may connect control circuitry 804 (and specifically processing circuitry 806) to one or more communication paths (described below). I/O functions may be provided by one or more of these communication paths but are shown as a single path in FIG. 8 to avoid overcomplicating the drawing. While set-top box 816 is shown in FIG. 8 for illustration, any suitable computing device having processing circuitry, control circuitry, and storage may be used in accordance with the present disclosure. For example, set-top box 816 may be replaced by, or complemented by, a personal computer (e.g., a notebook, a laptop, a desktop), a smartphone (e.g., device 800), a tablet, a network-based server hosting a user-accessible client device, a non-user-owned device, any other suitable device, or any combination thereof.

Control circuitry 804 may be based on any suitable processing circuitry such as processing circuitry 806. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for an application VAS assignment engine stored in memory (e.g., storage 808). Specifically, control circuitry 804 may be instructed by the application to perform the functions discussed above and below. For example, the application may provide instructions to control circuitry 804 to determine different VAS skills, capabilities, and/or statuses. In some implementations, any action performed by control circuitry 804 may be based on instructions received from the application.

In some client/server-based embodiments, control circuitry 804 includes communications circuitry suitable for communicating with an application server. A voice engine may be a stand-alone application implemented on a device or a server. A voice engine may be implemented as software or a set of executable instructions. The instructions for performing any of the embodiments discussed herein of the VAS assignment engine may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 8, the instructions may be stored in storage 808, and executed by control circuitry 804 of a device 800.

In some embodiments, a VAS assignment engine may be a client/server application where only the client application resides on device 800 (e.g., devices 902A-F), and a server application resides on an external server (e.g., server 906). For example, a VAS assignment engine may be implemented partially as a client application on control circuitry 804 of device 800 and partially on server 906 as a server application running on control circuitry. Server 906 may be a part of a local area network with one or more of devices 902A-F or may be part of a cloud computing environment accessed via the internet. In a cloud computing environment, various types of computing services for performing searches on the internet or informational databases, providing storage (e.g., for a database or scoring table) or parsing data are provided by a collection of network-accessible computing and storage resources (e.g., server 906), referred to as "the cloud." Device 800 may be a cloud client that relies on the cloud computing capabilities from server 906 to determine network devices and/or traffic or provide personalized advertisements. When executed by control circuitry of server 906, the VAS assignment engine may instruct the control circuitry to generate the VAS assignment engine output (e.g., VAS assignment, context identification, skill assessments, interaction, requests for permission, VAS statuses, and/or other outputs) and transmit the generated output to one or more of devices 902A-F. The client application may instruct control circuitry of the receiving device 902A-F to generate the VAS assignment engine output. Alternatively, one or more of devices 902A-F may perform all computations locally via control circuitry 804 without relying on server 906.

Control circuitry 804 may include communications circuitry suitable for communicating with a VAS server, a table or database server, or other networks or servers. The instructions for carrying out the above-mentioned functionality may be stored and executed on the application server 906. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the internet or any other suitable communication network or paths. In addition, communications circuitry may include circuitry that enables peer-to-peer communication of devices, or communication of devices in locations remote from each other.

Memory may be an electronic storage device such as storage 808, which is part of control circuitry 804. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 808 may be used to store various types of content described herein as well as content guidance data described above. Nonvolatile memory may also be used (e.g., to launch a boot-up routine and other instructions). Cloud-based storage, for example, (e.g., on server 906) may be used to supplement storage 808 or instead of storage 808.

A user may send instructions to control circuitry 804 using user input interface 810. User input interface 810 and display 812 may be any suitable interface such as a touchscreen, touchpad, or stylus and/or may be responsive to external device add-ons, such as a remote control, mouse, trackball, keypad, keyboard, joystick, voice recognition interface, or other user input interfaces. Display 812 may include a touchscreen configured to provide a display and receive haptic input. For example, the touchscreen may be configured to receive haptic input from a finger, a stylus, or both. In some embodiments, equipment device 800 may include a front-facing screen and a rear-facing screen, multiple front screens, or multiple angled screens. In some embodiments, user input interface 810 includes a remote-control device having one or more microphones, buttons, keypads, any other components configured to receive user input or combinations thereof. For example, user input interface 810 may include a handheld remote-control device having an alphanumeric keypad and option buttons. In a further example, user input interface 810 may include a handheld remote-control device having a microphone and control circuitry configured to receive and identify voice commands and transmit information to set-top box 816.

Audio equipment 814 may be integrated with or combined with display 812. Display 812 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 812. Audio equipment 814 may be provided as integrated with other elements of each one of device 800 and equipment 801 or may be stand-alone units. An audio component of videos and other content displayed on display 812 may be played through speakers (or headphones) of audio equipment 814. In some embodiments, audio may be distributed to a receiver (not shown), which processes and outputs the audio via speakers of audio equipment 814. In some embodiments, for example, control circuitry 804 is configured to provide audio cues to a user, or other audio feedback to a user, using speakers of audio equipment 814. There may be a separate microphone 816 or audio equipment 814 may include a microphone configured to receive audio input such as voice commands or speech. For example, a user may speak letters or words that are received by the microphone and converted to text by control circuitry 804. In a further example, a user may voice commands that are received by a microphone and recognized by control circuitry 804. Camera 818 may be any suitable video camera integrated with the equipment or externally connected. Camera 818 may be a digital camera comprising a charge-coupled device (CCD) and/or a complementary metal-oxide semiconductor (CMOS) image sensor. Camera 818 may be an analog camera that converts to digital images via a video card.

An application (e.g., for generating a display) may be implemented using any suitable architecture. For example, a stand-alone application may be wholly implemented on each one of device 800 and equipment 801. In some such embodiments, instructions of the application are stored locally (e.g., in storage 808), and data for use by the application is downloaded on a periodic basis (e.g., from an out-of-band feed, from an internet resource, or using another suitable approach). Control circuitry 804 may retrieve instructions of the application from storage 808 and process the instructions to generate any of the displays discussed herein. Based on the processed instructions, control circuitry 804 may determine what action to perform when input is received from input interface 810. For example, movement of a cursor on a display up/down may be indicated by the processed instructions when input interface 810 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 804 may allow a user to provide user profile information or may automatically compile user profile information. For example, control circuitry 804 may access and monitor network data, video data, audio data, processing data, participation data from a participant profile. In some embodiments, control circuitry 804 may calculate several scores, such as a readiness score, based on profile data. Control circuitry 804 may store scores in a database and the database may be linked to a user profile. Additionally, control circuitry 804 may obtain all or part of other user profiles that are related to a particular user (e.g., via social media networks), and/or obtain information about the user from other sources that control circuitry 804 may access. As a result, a user can be provided with a unified experience across different devices.

In some embodiments, the application is a client/server-based application. Data for use by a thick or thin client implemented on each one of device 800 and equipment 801 is retrieved on demand by issuing requests to a server remote from each one of device 800 and equipment 801. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on device 800. This way, the processing of the instructions is performed remotely by the server while the resulting displays (e.g., that may include text, a keyboard, or other visuals) are provided locally on device 800. Device 800 may receive inputs from the user via input interface 810 and transmit those inputs to the remote server for processing and generating the corresponding displays and output. For example, device 800 may transmit a communication to the remote server indicating that an up/down button was selected via input interface 810. The remote server may process instructions in accordance with that input and generate a display of the application corresponding to the input (e.g., a display that moves a cursor up/down). The generated display is then transmitted to device 800 for presentation to the user.

Figure 9:
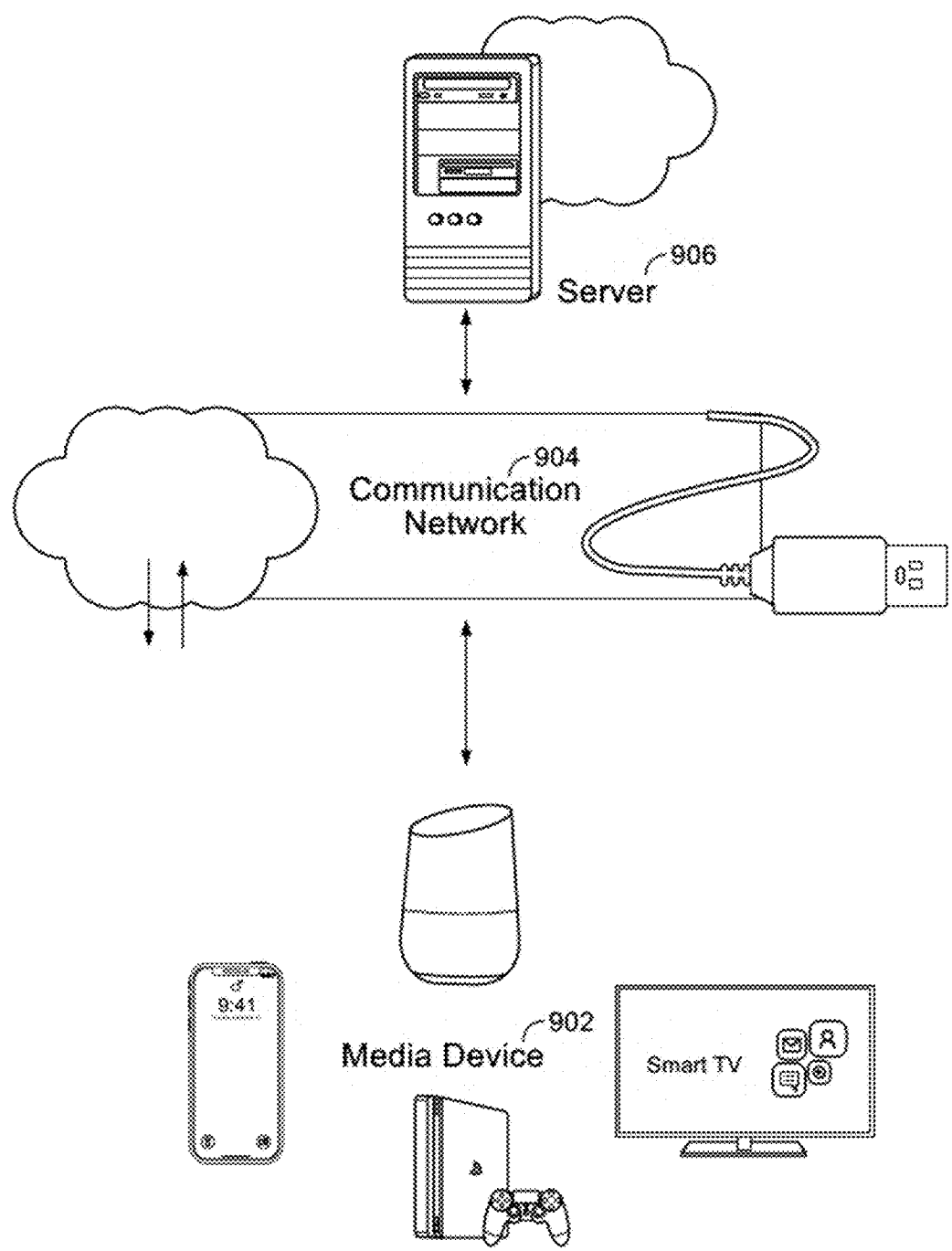
FIG. 9 is a diagram of an illustrative system, in accordance with some embodiments of the disclosure.

As depicted in FIG. 9, one or more of devices 902A-F may be coupled to communication network 904. Communication network 904 may be one or more networks including the internet, a mobile phone network, mobile voice or data network (e.g., a 5G or 4G or LTE network), cable network, public switched telephone network, Bluetooth, or other types of communication network or combinations of communication networks. Thus, devices 902A-F may communicate with server 906 over communication network 904 via communications circuitry described above. In should be noted that there may be more than one server 906, but only one is shown in FIG. 9 to avoid overcomplicating the drawing. The arrows connecting the respective device(s) and server(s) represent communication paths, which may include a satellite path, a fiber-optic path, a cable path, a path that supports internet communications (e.g., IPTV), free-space connections (e.g., for broadcast or other wireless signals), or any other suitable wired or wireless communication path or combination of such paths.

In some embodiments, the application is downloaded and interpreted or otherwise run by an interpreter or virtual machine (e.g., run by control circuitry 804). In some embodiments, the application may be encoded in the ETV Binary Interchange Format (EBIF), received by control circuitry 804 as part of a suitable feed, and interpreted by a user agent running on control circuitry 804. For example, the application may be an EBIF application. In some embodiments, the application may be defined by a series of JAVA-based files that are received and run by a local virtual machine or other suitable middleware executed by control circuitry 804.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of assigning a voice assistant service (VAS) for a voice command, the method comprising:
   receiving, by a device having at least a first VAS and a second VAS, a voice input comprising a voice input context;
   determining whether the voice input context requires a VAS skill to access third-party data related to the voice input context;
   in response to determining that the voice input context requires the VAS skill to access the third-party data, accessing authorization data for each of a plurality of skills for the first VAS;
   determining whether the authorization data describing for each of the plurality of skills for the first VAS indicates the first VAS is authorized to access the third-party data; and
   based at least in part on determining the authorization data for each of the plurality of skills for the first VAS indicates the first VAS is not authorized to access the third-party data:
   determining the second VAS with a plurality of skills has the VAS skill to access the third-party data; and
   causing the second VAS to respond to the voice input using the VAS skill to access the third-party data.

2. The method of claim 1, further comprising, determining whether the authorization data for each of the plurality of skills for the first VAS indicates if the first VAS is authorized to access the third-party data by determining whether the first VAS is unavailable.

3. The method of claim 2, wherein unavailable comprises any of the following: busy, powered off, muted, disconnected, in a sleep mode, or in a do-not-disturb mode.

4. The method of claim 1, further comprising: determining whether the authorization data for each of the plurality of skills for the first VAS indicates if the first VAS is authorized to access the third-party data by determining whether the first VAS is compatible with the VAS skill.

5. The method of claim 1, wherein the causing the second VAS to respond to the voice input comprises requesting permission to enable the VAS skill.

6. The method of claim 1, wherein the determining the second VAS further comprises determining whether the VAS skill is enabled on the second VAS; and
   wherein the causing the second VAS to respond to the voice input comprises requesting permission to enable the VAS skill in response to determining the VAS skill is not enabled on the second VAS.

7. The method of claim 1, wherein the determining whether the voice input context requires the VAS skill comprises determining whether the voice input context or the VAS skill is urgent; and
   wherein determining whether the authorization data for each of the plurality of skills for the first VAS indicates the first VAS is authorized to access the third-party data comprises overriding a determination that the first VAS is not available.

8. The method of claim 1, wherein the determining whether the voice input context requires the VAS skill comprises classifying the voice input context as a generic context or a VAS-specific context.

9. The method of claim 8, wherein the classifying the voice input context comprises using a trained machine learning model to classify the voice input context as the generic context or the VAS-specific context.

10. The method of claim 8, wherein the classifying the voice input context comprises:
    processing the voice input context as a plurality of segments;
    determining whether the plurality of segments requires a joint command execution or in a partial command execution;
    implementing a parallel processing of the plurality of segments in response to determining that the plurality of segments requires the joint command execution; and
    implementing a sequential processing of the plurality of segments in response to determining that the plurality of segments requires the partial command execution.

11. A system for assigning a voice assistant service (VAS) for a voice command, the system comprising:
    memory;
    input/output circuitry configured to receive a voice input comprising a voice input context;
    processing circuitry configured to:
    determine whether the voice input context requires a VAS skill to access third-party data related to the voice input context;
    in response to determining that the voice input context requires the VAS skill to access the third-party data, access authorization data for each of a plurality of skills for a first VAS;
    determine whether the authorization data for each of the plurality of skills for the first VAS indicates the first VAS is authorized to access the third-party data; and
    based at least in part on determining the authorization data for each of the plurality of skills for the first VAS indicates the first VAS is not authorized to access the third-party data:

determine a second VAS with a plurality of skills has the VAS skill to access the third-party data; and cause the second VAS to respond to the voice input using the VAS skill to access the third-party data.

12. The system of claim 11, wherein the processing circuitry is further configured to determine whether the authorization data for each of the plurality of skills for the first VAS indicates if the first VAS is byauthorized to access the third-party data by determining whether the first VAS is unavailable.

13. The system of claim 12, wherein unavailable comprises any of the following: busy, powered off, muted, disconnected, in a sleep mode, or in a do-not-disturb mode.

14. The system of claim 11, wherein the processing circuitry is further configured to determine whether the authorization data for each of the plurality of skills for the first VAS indicates if the first VAS is authorized to access the third-party data by determining whether the first VAS is compatible with the VAS skill.

15. The system of claim 11, wherein the processing circuitry is further configured to cause the second VAS to respond to the voice input by requesting permission to enable the VAS skill.

16. The system of claim 11, wherein the processing circuitry is further configured to determine a second VAS by determining whether the VAS skill is enabled on the second VAS; and wherein the processing circuitry is further configured to cause the second VAS to respond to the voice input by requesting permission to enable the VAS skill in response to determining the VAS skill is not enabled on the second VAS.

17. The system of claim 11, wherein the processing circuitry is further configured to determine whether the voice input context requires the VAS skill by determining whether the voice input context or the VAS skill is urgent; and wherein the processing circuitry is further configured to determine whether the authorization data for each of the plurality of skills for the first VAS indicates the first VAS is authorized to access the third-party data by overriding a determination that the first VAS is not available.

18. The system of claim 11, wherein the processing circuitry is further configured to determine whether the voice input context requires the VAS skill by classifying the voice input context as a generic context or a VAS-specific context.

19. The system of claim 18, wherein the processing circuitry is further configured to classify the voice input context by:

processing the voice input context as a plurality of segments;

determining whether the plurality of segments requires a joint command execution or in a partial command execution;

implementing a parallel processing of the plurality of segments in response to determining that the plurality of segments requires the joint command execution; and implementing a sequential processing of the plurality of segments in response to determining that the plurality of segments requires the partial command execution.

20. A method comprising:

receiving, by a device having at least a first voice assistant service (VAS) and a second VAS, a voice input comprising a voice input context;

determining whether the voice input context requires a VAS skill to access third-party data related to the voice input context;

in response to determining that the voice input context requires the VAS skill to access the third-party data, accessing authorization data for each of one or more skills for the first VAS;

determining whether the authorization data for each of the one or more skills for the first VAS indicates the first VAS is authorized to access the third-party data; and based at least in part on determining the authorization data for each of the one or more skills for the first VAS indicates the first VAS is not authorized to access the third-party data:

determining the second VAS has the VAS skill to access the third-party data; and causing the second VAS to respond to the voice input using the VAS skill to access the third-party data.

* * * * *

UNITED STATES PATENT AND TRADEMARK OFFICE
CERTIFICATE OF CORRECTION

PATENT NO. : 12,315,514 B2
APPLICATION NO. : 17/865567
DATED : May 27, 2025
INVENTOR(S) : Gyanveer Singh and Reda Harb Page 1 of 1

It is certified that error appears in the above-identified patent and that said Letters Patent is hereby corrected as shown below:

In the Claims

Claim 12, Column 23, Line 8, please delete "byauthorized" and replace it with --authorized--

Signed and Sealed this
Fifteenth Day of July, 2025

Coke Morgan Stewart
*Acting Director of the United States Patent and Trademark Office*